US011606265B2

(12) United States Patent
Dechene et al.

(10) Patent No.: US 11,606,265 B2
(45) Date of Patent: Mar. 14, 2023

(54) NETWORK CONTROL IN ARTIFICIAL INTELLIGENCE-DEFINED NETWORKING

(71) Applicant: World Wide Technology Holding Co., LLC, Maryland Heights, MO (US)

(72) Inventors: Remington Dechene, Laporte, CO (US); Rui Zhang, Cary, NC (US); Henry Stoltenberg, Walnut Creek, CA (US)

(73) Assignee: WORLD WIDE TECHNOLOGY HOLDING CO., LLC, Maryland Heights, MO (US)

( * ) Notice: Subject to any disclaimer, the term of this patent is extended or adjusted under 35 U.S.C. 154(b) by 0 days.

(21) Appl. No.: 17/162,719

(22) Filed: Jan. 29, 2021

(65) Prior Publication Data

US 2022/0247643 A1 Aug. 4, 2022

(51) Int. Cl.
*H04L 41/16* (2022.01)
*H04L 45/02* (2022.01)
(Continued)

(52) U.S. Cl.
CPC .......... *H04L 41/16* (2013.01); *H04L 41/0843* (2013.01); *H04L 41/145* (2013.01);
(Continued)

(58) Field of Classification Search
CPC ....... H04L 41/16; H04L 45/64; H04L 41/145; H04L 41/0843; H04L 45/02; H04L 45/08; H04L 41/147
See application file for complete search history.

(56) References Cited

U.S. PATENT DOCUMENTS 6,804,201 B1 10/2004 Gelenbe
8,305,926 B2 11/2012 Clark et al.
(Continued)

FOREIGN PATENT DOCUMENTS

CN 108900419 4/2020
CN 110986979 4/2020
(Continued)

OTHER PUBLICATIONS

D. B. Hoang and M. Pham, "On software-defined networking and the design of SDN controllers," 2015 6th International Conference on the Network of the Future (NOF), 2015, pp. 1-3, doi: 10.1109/NOF.2015.7333307. (Year: 2015).*

(Continued)

*Primary Examiner* — Patrice L Winder
(74) *Attorney, Agent, or Firm* — Bryan Cave Leighton Paisner LLP

(57) ABSTRACT

A system including one or more processors and one or more non-transitory computer-readable media storing computing instructions that, when executed on the one or more processors, perform certain acts. The acts can include receiving a deployment model selection of a software-defined-network (SDN) control service. The deployment model selection includes one of a centralized model, a decentralized model, a distributed model, or a hybrid model. The acts also can include deploying the SDN control service in the deployment model selection to control a physical computer network. The SDN control service uses a routing agent model trained using a reinforcement-learning model. Other embodiments are described.

26 Claims, 22 Drawing Sheets

(51) Int. Cl.
*H04L 41/084* (2022.01)
*H04L 41/14* (2022.01)
*H04L 45/64* (2022.01)

(52) U.S. Cl.
CPC .............. *H04L 45/02* (2013.01); *H04L 45/08* (2013.01); *H04L 45/64* (2013.01)

(56) References Cited

U.S. PATENT DOCUMENTS

| | | | |
|---|---|---|---|
| 8,315,265 B2 | 11/2012 | Derou-Madeline et al. | |
| 8,423,483 B2 | 4/2013 | Sadeh-Koniecpol et al. | |
| 8,560,647 B2* | 10/2013 | Zhang | H04W 16/18 709/220 |
| 8,593,993 B2 | 11/2013 | Clark et al. | |
| 8,782,244 B2 | 7/2014 | Lake, Sr. et al. | |
| 8,918,350 B2 | 12/2014 | Toscano et al. | |
| 9,191,304 B1 | 11/2015 | Plate et al. | |
| 9,432,257 B2* | 8/2016 | Li | H04L 41/0823 |
| 9,552,550 B2 | 1/2017 | Vasseur et al. | |
| 9,729,582 B2 | 8/2017 | Loo et al. | |
| 9,749,188 B2 | 8/2017 | Vasseur et al. | |
| 9,774,522 B2 | 9/2017 | Vasseur et al. | |
| 9,838,268 B1* | 12/2017 | Mattson | H04L 41/044 |
| 9,847,951 B2 | 12/2017 | Htay et al. | |
| 9,853,882 B2 | 12/2017 | Vasseur et al. | |
| 9,929,933 B1 | 3/2018 | Viljoen | |
| 9,948,606 B2* | 4/2018 | Shaikh | H04L 63/1408 |
| 10,102,474 B2 | 10/2018 | Alvarez-Icaza Rivera et al. | |
| 10,142,909 B2 | 11/2018 | Hu et al. | |
| 10,153,978 B1 | 12/2018 | di Proietto et al. | |
| 10,187,413 B2 | 1/2019 | Vasseur et al. | |
| 10,217,060 B2 | 2/2019 | Yousefi'zadeh et al. | |
| 10,257,072 B1 | 4/2019 | Salam | |
| 10,320,824 B2 | 6/2019 | Vasseur et al. | |
| 10,331,973 B2* | 6/2019 | Wang | H04L 41/145 |
| 10,404,727 B2 | 9/2019 | Vasseur et al. | |
| 10,476,779 B1 | 11/2019 | Barth et al. | |
| 10,546,250 B2 | 1/2020 | Brumley, II et al. | |
| 10,560,334 B2 | 2/2020 | Barth et al. | |
| 10,574,586 B2 | 2/2020 | Chen | |
| 10,608,893 B2* | 3/2020 | Di Martino | H04L 41/12 |
| 10,652,154 B1 | 5/2020 | Matthews et al. | |
| 10,666,547 B2 | 5/2020 | Sanchez Charles et al. | |
| 10,681,435 B2 | 6/2020 | Rafique et al. | |
| 10,686,669 B2* | 6/2020 | Nagarajan | H04L 41/145 |
| 10,693,740 B2 | 6/2020 | Coccia et al. | |
| 10,708,167 B2 | 7/2020 | Jiang et al. | |
| 10,728,773 B2 | 7/2020 | Ouyang et al. | |
| 10,728,954 B2 | 7/2020 | Dahan et al. | |
| 10,735,273 B2 | 8/2020 | Kaplunov et al. | |
| 10,805,211 B2* | 10/2020 | Wetterwald | H04L 45/302 |
| 10,873,533 B1* | 12/2020 | Ismailsheriff | H04L 47/27 |
| 2017/0012866 A1* | 1/2017 | Balasubramanian | H04L 41/0803 |
| 2018/0183727 A1 | 6/2018 | Kumar et al. | |
| 2018/0183728 A1 | 6/2018 | Kumar et al. | |
| 2018/0373961 A1* | 12/2018 | Wang | H04L 41/16 |
| 2019/0123974 A1 | 4/2019 | Georgios et al. | |
| 2019/0138948 A1 | 5/2019 | Janulewicz et al. | |
| 2019/0253328 A1 | 8/2019 | Kolar et al. | |
| 2019/0260787 A1 | 8/2019 | Zou | |
| 2019/0306030 A1 | 10/2019 | Chen | |
| 2019/0342222 A1 | 11/2019 | di Proietto et al. | |
| 2019/0349287 A1 | 11/2019 | Chandra Sekar Rao et al. | |
| 2019/0372826 A1 | 12/2019 | Sherr | |
| 2019/0378098 A1 | 12/2019 | Lam et al. | |
| 2020/0021490 A1 | 1/2020 | Schrimpsher et al. | |
| 2020/0037149 A1 | 1/2020 | Ganu et al. | |
| 2020/0044909 A1 | 2/2020 | Huang et al. | |
| 2020/0067637 A1 | 2/2020 | Wang et al. | |
| 2020/0084142 A1 | 3/2020 | Bochkar | |
| 2020/0092254 A1 | 3/2020 | Goeringer et al. | |
| 2020/0169472 A1 | 5/2020 | Karve et al. | |
| 2020/0186433 A1 | 6/2020 | Cui et al. | |
| 2020/0213199 A1 | 7/2020 | Sethi et al. | |
| 2020/0244728 A1 | 7/2020 | Jha et al. | |
| 2020/0259717 A1* | 8/2020 | Ong | H04L 41/16 |
| 2020/0259758 A1 | 8/2020 | Vytla | |
| 2020/0260361 A1 | 8/2020 | Donikian | |
| 2021/0099378 A1* | 4/2021 | Alaettinoglu | H04L 43/0852 |
| 2021/0211371 A1* | 7/2021 | Ceccarelli | H04L 45/08 |
| 2022/0076066 A1* | 3/2022 | Forgeat | G06N 3/0454 |

FOREIGN PATENT DOCUMENTS

| | | |
|---|---|---|
| CN | 111010294 | 4/2020 |
| CN | 111106999 | 5/2020 |
| CN | 111416771 | 7/2020 |
| WO | 2000045584 | 8/2000 |

OTHER PUBLICATIONS

Qing He, A. Moayyedi, G. Dán, G. P. Koudouridis and P. Tengkvist, "A Meta-Learning Scheme for Adaptive Short-Term Network Traffic Prediction," in IEEE Journal on Selected Areas in Communications, vol. 38, No. 10, pp. 2271-2283, Oct. 2020, doi: 10.1109/JSAC.2020.3000408. (Year: 2020).*

Sun et al., "TIDE: Time-Relevant Deep Reinforcement Learning for Routing Optimization," Future Generation Computer Systems, (2019) vol. 99, pp. 401-409, https://www.sciencedirect.com/science/article/abs/pii/S0167739X19305424, Oct. 2019.

Wu et al., "Towards Cognitive Routing based on Deep Reinforcement Learning," arXiv:2003.12439v1 [cs.NI], https://arxiv.org/pdf/2003.12439.pdf, Mar. 19, 2020.

Stampa et al., "A Deep-Reinforcement Learning Approach for Software-Defined Networking Routing Optimization," arXiv:1709.07080v1 [cs.NI], https://arxiv.org/abs/1709.07080, Sep. 20, 2017.

Hardegen et al., "Flow-based Throughput Prediction using Deep Learning and Real-World Network Traffic," 2019 15th International Conference on Network and Service Management (CNSM), vol. 1, pp. 1-9, DOI: 10.23919/CNSM46954.2019.9012716, https://ieeexplore.ieee.org/abstract/document/9012716, Oct. 21-25, 2019.

Kim et al., "Intelligent Reinforcement-learning-based Network Management, draft-kim-nmrg-rl-05," Network Management Research Group, pp. 1-12, https://tools.ietf.org/id/draft-kim-nmrg-rl-05.html, Jul. 8, 2019.

Jay et al., "A Deep Reinforcement Learning Perspective on Internet Congestion Control," Proceedings of the 36th International Conference on Machine Learning, arXiv: 1810.03259v3 [cs.NI], pp. 1-10, https://arxiv.org/pdf/1810.03259.pdf, May 21, 2019.

Valadarsky et al., "Learning to Route with Deep RL," 31st Conference on Neural Information Processing Systems (NIPS 2017), pp. 1-11, 2017.

Boutaba et al., "A Comprehensive Survey on Machine Learning for Networking: Evolution, Applications and Research Opportunities," Journal of Internet Services and Applications, (2018) 9:16, pp. 1-99, https://doi.org/10.1186/s13174-018-0087-2, Jun. 21, 2018.

Boyan et al., "Packet Routing in Dynamically Changing Networks: A Reinforcement Learning Approach," Advances in Neural Information Processing Systems, vol. 6, pp. 1-8, https://www.researchgate.net/publication/2578530_Packet_Routing_in_Dynamically_Changing_Networks_A_Reinforcement_Learning_Approach, Oct. 14, 1999.

* cited by examiner

NETWORK CONTROL IN ARTIFICIAL INTELLIGENCE-DEFINED NETWORKING

TECHNICAL FIELD

This disclosure relates generally to artificial intelligence-defined computer networking.

BACKGROUND

Computer networks traditionally utilize static or dynamically generated routing table entries to determine packet path selection. In dynamic routing protocols such as BGP (Border Gateway Protocol), EIGRP (Enhanced Interior Gateway Routing Protocol), and OSPF (Open Shortest Path First), route tables are populated after a route selection process. Route selection occurs after a complicated router peering and table or route exchange process known as convergence. Convergence time and complexity increase with the routing domain's size, leading to delayed recovery from failures and substantial computational overhead when topologies change.

Routing protocols are typically configured by a human administrator. Administrators can manipulate the protocol's routing domain and performance through summarization, route metric, weight tuning, and other protocol specific tuning parameters. Protocol administration can be error-prone, with a substantial effort involved in route tuning and traffic engineering to enforce business specifications or policy. Changing routing behavior to reflect business specifications, such as prioritizing certain traffic types or links, is performed with simple match, classification, marking, or route prioritization criteria.

Traditional networks are also constrained by a limited observable set space by which the routing protocol can utilize to determine a preferred action. Typical routing implementations within a Local Area Network (LAN) include a statically defined default route to unknown networks via a specific gateway address, and dynamically generated routes from routing processes. Dynamically generated routes are prioritized during convergence to provide primary, secondary and sometimes tertiary paths. Prioritizing available routes is typically done on basic observations such as hop count, path link speed, route origination, reliability or administrative distance. As additional routes become available, nodes allocate precious hardware resources and table space to hold the routes and candidate routes. These operations are typically performed with dedicated and costly chipsets.

BRIEF DESCRIPTION OF THE DRAWINGS

To facilitate further description of the embodiments, the following drawings are provided in which.

Figure 1:
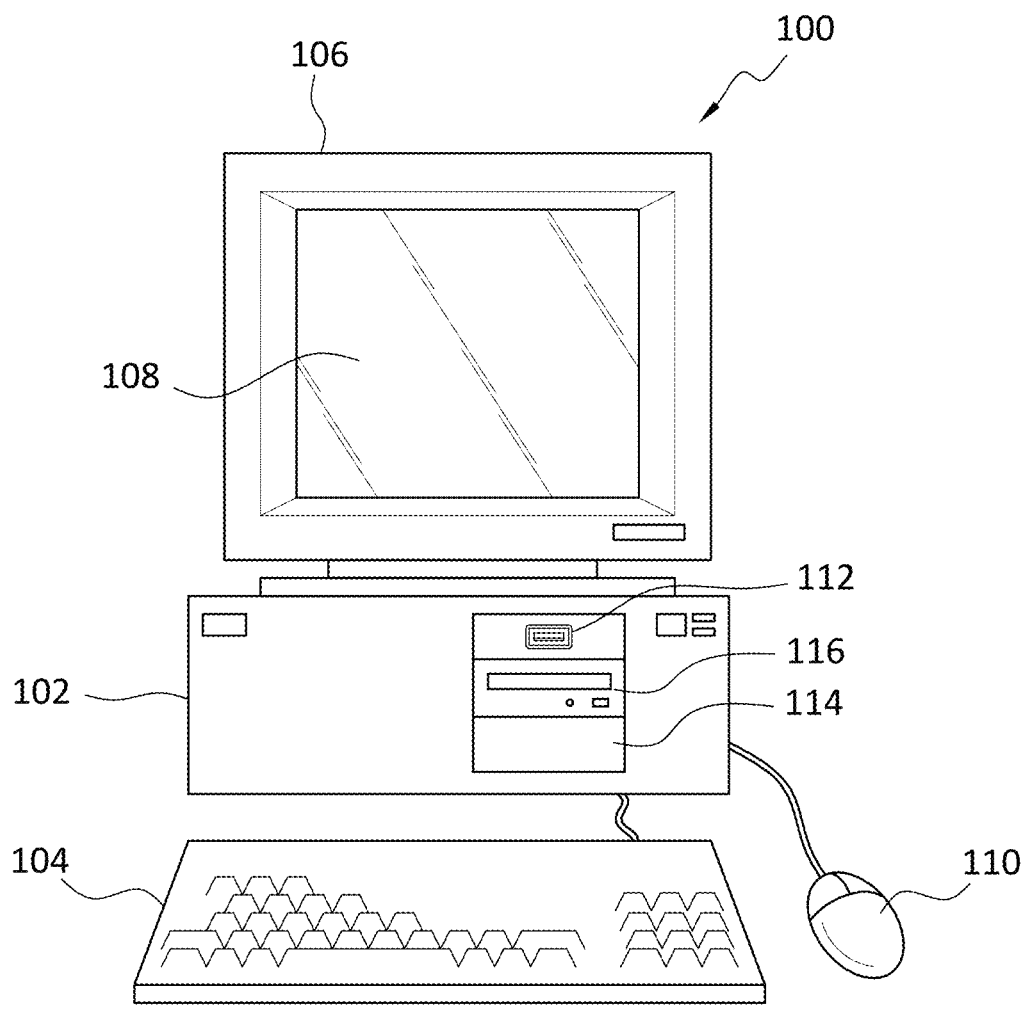
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 millisecond (ms), 10 ms, 50 ms, 100 ms, 500 ms, or 1 second (s).

DESCRIPTION OF EXAMPLES OF EMBODIMENTS

In a number of embodiments, the systems and methods described herein can be used for training and implementing Artificial Intelligence (AI) agent(s) within computer networks that make routing decisions based on network policies called AI-defined networking. The AI agent process itself can be trained on a "digital twin" simulation of the network. The agent can be trained with simulated network traffic that is representative of real traffic patterns. Various embodiments of an AI-defined network solution can be administered through a User Interface (UI) that supports AI training scenarios and parameter tuning.

The AI-defined networking solution can alleviate the challenges found in conventional approaches, through the use of Reinforcement Learning (RL) trained neural network agent(s) that can make routing decisions. The agent(s) themselves can be trained through a digital twin simulation of the network environment with representative network traffic.

Various embodiments include a method implemented via execution of computing instructions at one or more processors. The method can include generating a digital twin network simulation of a physical computer network controlled through a software-defined-network (SDN) control system. The method also can include training a routing agent model on the digital twin network simulation using a reinforcement-learning model on traffic that flows through nodes of the digital twin network simulation. The routing agent model includes a machine-learning model. The method additionally can include deploying the routing agent model, as trained, from the digital twin network simulation to the SDN control system of the physical computer network.

A number of embodiments include a system including one or more processors and one or more non-transitory computer-readable media storing computing instructions that, when executed on the one or more processors, perform certain acts. The acts can include generating a digital twin network simulation of a physical computer network controlled through a software-defined-network (SDN) control system. The acts also can include training a routing agent model on the digital twin network simulation using a reinforcement-learning model on traffic that flows through nodes of the digital twin network simulation. The routing agent model includes a machine-learning model. The acts additionally can include deploying the routing agent model, as trained, from the digital twin network simulation to the SDN control system of the physical computer network.

Additional embodiments include a method implemented via execution of computing instructions at one or more processors. The method can include transmitting a user interface to be displayed to a user. The user interface can include one or more first interactive elements. The one or more first interactive elements display policy settings of a reinforcement learning model. The one or more first interactive elements are configured to allow the user to update the policy settings of the reinforcement learning model. The method also can include receiving one or more inputs from the user. The inputs include one or more modifications of at least a portion of the one or more first interactive elements of the user interface to update the policy settings of the reinforcement learning model. The method additionally can include training a neural network model using a reinforcement learning model with the policy settings as updated by the user to adjust rewards assigned in the reinforcement learning model.

Further embodiments include a system including one or more processors and one or more non-transitory computer-readable media storing computing instructions that, when executed on the one or more processors, perform certain acts. The acts can include transmitting a user interface to be displayed to a user. The user interface can include one or more first interactive elements. The one or more first interactive elements display policy settings of a reinforcement learning model. The one or more first interactive elements are configured to allow the user to update the policy settings of the reinforcement learning model. The acts also can include receiving one or more inputs from the user. The inputs include one or more modifications of at least a portion of the one or more first interactive elements of the user interface to update the policy settings of the reinforcement learning model. The acts additionally can include training a neural network model using a reinforcement learning model with the policy settings as updated by the user to adjust rewards assigned in the reinforcement learning model.

Additional embodiments include a method implemented via execution of computing instructions at one or more processors. The method can include receiving a deployment model selection of a software-defined-network (SDN) control service. The deployment model selection includes one of a centralized model, a decentralized model, a distributed model, or a hybrid model. The method also can include deploying the SDN control service in the deployment model selection to control a physical computer network. The SDN control service uses a routing agent model trained using a reinforcement-learning model.

Further embodiments include a system including one or more processors and one or more non-transitory computer-readable media storing computing instructions that, when executed on the one or more processors, perform certain acts. The acts can include receiving a deployment model selection of a software-defined-network (SDN) control service. The deployment model selection includes one of a centralized model, a decentralized model, a distributed model, or a hybrid model. The acts also can include deploying the SDN control service in the deployment model selection to control a physical computer network. The SDN control service uses a routing agent model trained using a reinforcement-learning model.

Computer Hardware

Figure 2:
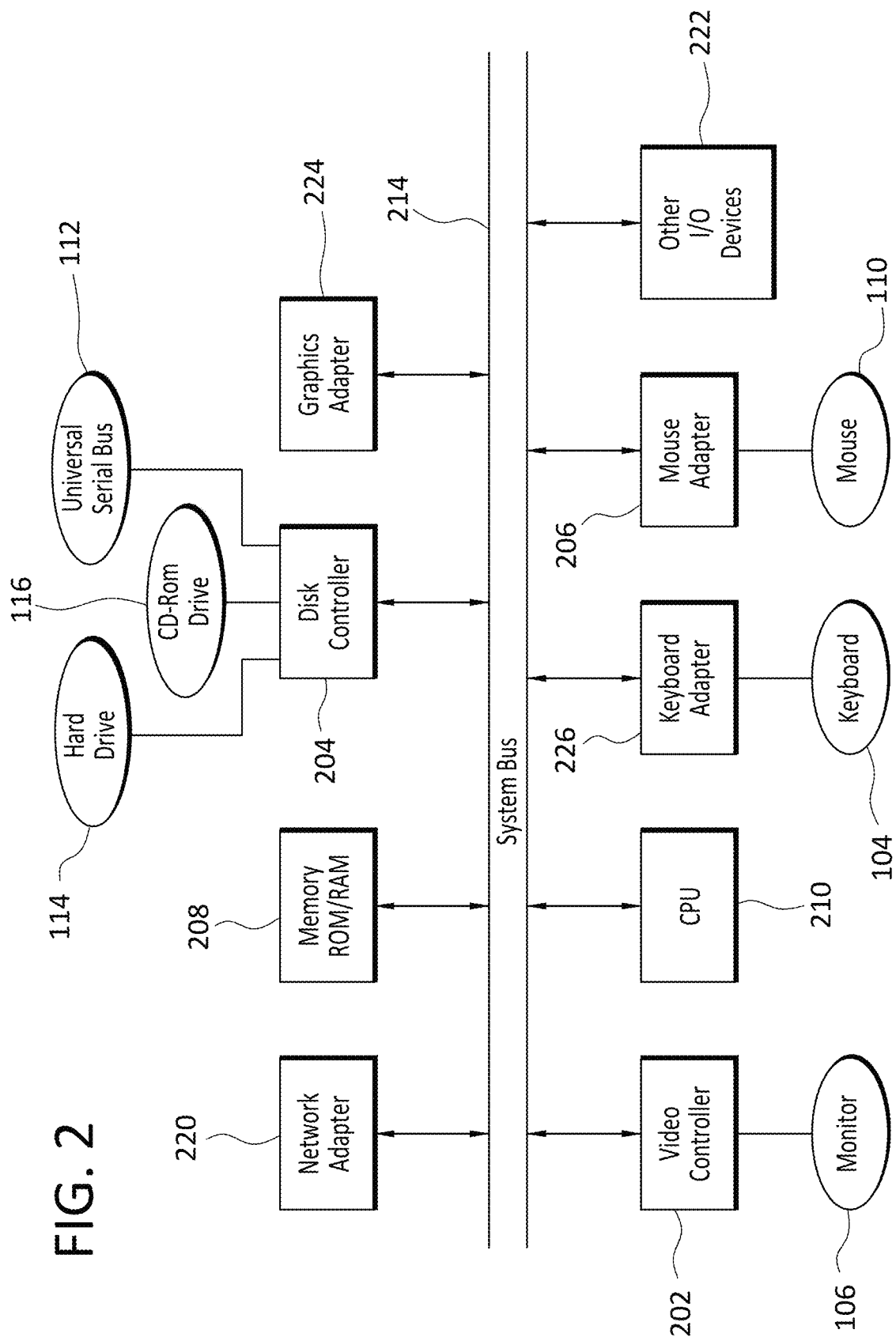
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) or Field Programmable Gate Arrays (FPGAs) can be programmed to carry out one or more of the systems and procedures described herein. For example, one or more of the programs and/or executable program components described herein can be implemented in one or more ASICs or FPGAs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

System Architecture

Figure 3:
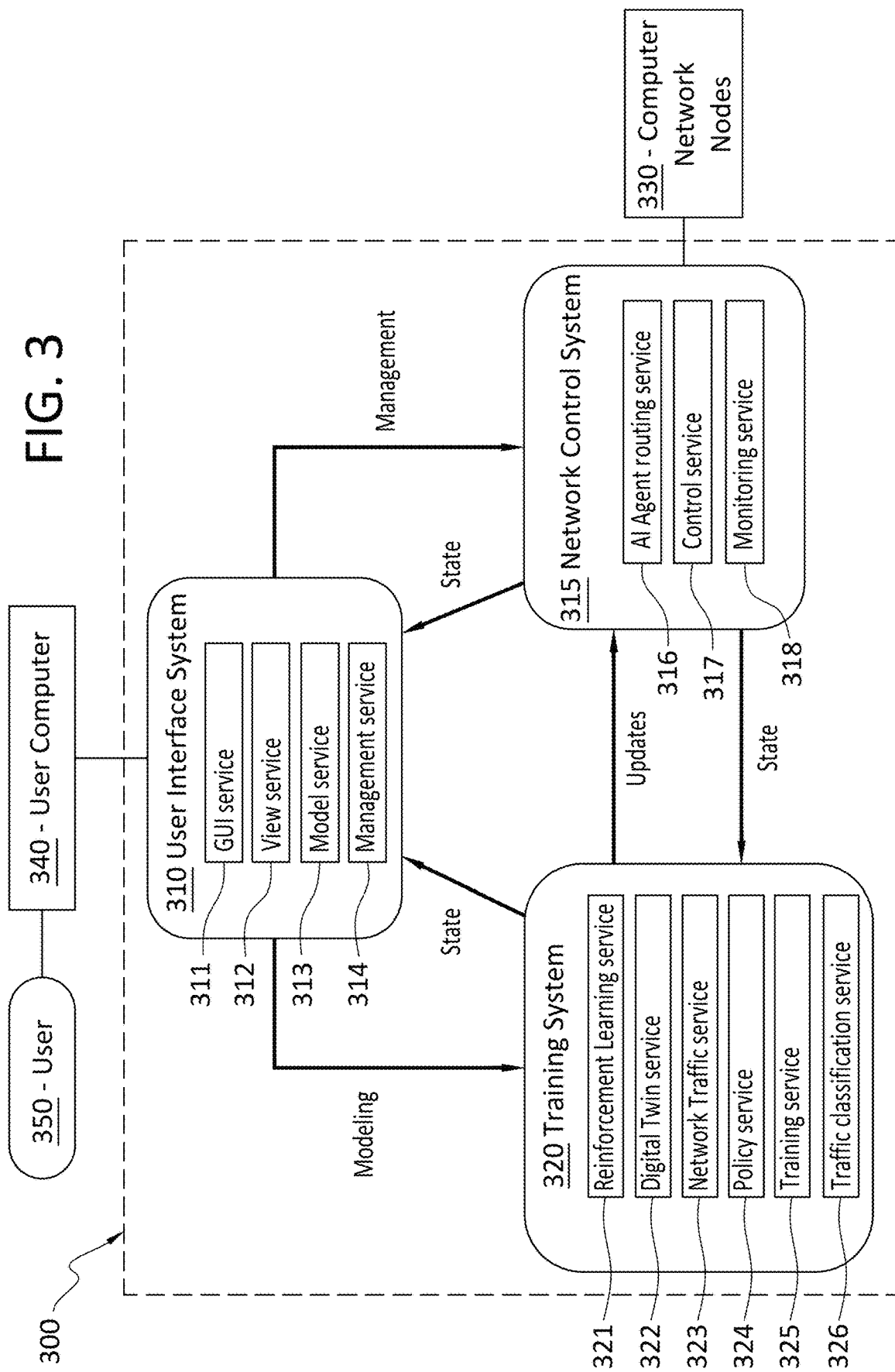
FIG. 3 illustrates a block diagram of a system that can be employed for AI-defined networking, according to an embodiment.

Turning ahead in the drawings, FIG. 3 illustrates a block diagram of a system 300 that can be employed for AI-defined networking, according to an embodiment. System 300 is merely exemplary and embodiments of the system are not limited to the embodiments presented herein. The system can be employed in many different embodiments or examples not specifically depicted or described herein. In some embodiments, certain elements, modules, or services of system 300 can perform various procedures, processes, and/or activities. In other embodiments, the procedures, processes, and/or activities can be performed by other suitable elements, modules, or services of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. In many embodiments, system 300 can include a user interface system 310, a network control system 315, and/or training system 320.

User interface system 310, a network control system 315, and/or training system 320 can each be a computer system, such as computer system 100 (FIG. 1), as described above, and can each be a single computer, a single server, or a cluster or collection of computers or servers, or a cloud of computers or servers. In another embodiment, a single computer system can host user interface system 310, a network control system 315, and/or training system 320. Additional details regarding user interface system 310, a network control system 315, and/or training system 320 are described herein.

In some embodiments, user interface system 310 can be in data communication, such as through a network, with one or more user devices, such as a user computer 340. User computer 340 can be part of system 300 or external to system 300. The network can be the Internet or another suitable network. In some embodiments, user computer 340 can be used by users, such as a user 350. In many embodiments, user interface system 310 can host one or more websites and/or mobile application servers. For example, user interface system 310 can host a website, or provide a server that interfaces with an application (e.g., a mobile application), on user computer 340, which can allow users (e.g., 350) to interface with system 300. In certain embodiments, the user devices (e.g., user device 340) can be desktop computers, laptop computers, mobile devices, and/or other endpoint devices used by one or more users (e.g., user 350).

In many embodiments, network control system 315 can be in data communication with a physical computer network, such as computer network nodes 330. Computer network nodes 330 can be routers, switches, and/or other computer networking elements. In many embodiments, each of the nodes of computer network nodes 330 can support a software-defined network (SDN) protocol, in which network control system 315 can be used to define network routing decisions for computer network nodes 330.

In many embodiments, user interface system 310, a network control system 315, and/or training system 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to demand shaping system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of user interface system 310, a network control system 315, and/or training system 320. In a similar manner, the processors and/or the non-transitory computer-readable media can be local and/or remote to each other.

Meanwhile, in many embodiments, user interface system 310, a network control system 315, and/or training system 320 also can be configured to communicate with one or more databases. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, Neo4j Graph Database, and MongoDB.

Meanwhile, user interface system 310, a network control system 315, training system 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, spine-leaf, Clos, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, training system 320 can generate an AI agent model that can be published to network control system 315 to make routing decisions. Training system 320 can include a reinforcement learning service 321, a digital twin service 322, a network traffic service 323, a policy service 324, a training service 325, and/or a traffic classification service 326. In many embodiments, training system 320 can be run by a reinforcement learning (RL) service, such as a Deep-Q Meta-Reinforcement Learning service, which can seek to train the AI agent. The RL training environment can be based on a simulated digital-twin network topology provided by digital twin service 322, and can augmented with synthetic network traffic provided by network traffic service 323. Different configuration items such as network topologies, synthetic network traffic, training scenarios (such as node addition or failure), and AI hyperparameters can be adjusted to customize (e.g., optimize) the agent model, such as through policy service 324. Training service 325 can be used to train the AI agent in the different scenarios. Traffic classification service 326 can facilitate intelligent traffic and application fingerprinting for use in training scenarios. Training system 320 can reside within or without an on-premises environment of network control system 315, as training can be abstracted from network control. Training service 325 can, in some embodiments, receive fuzzy metadata for training from network control system 315, such as when dictated by policy.

Figure 7:
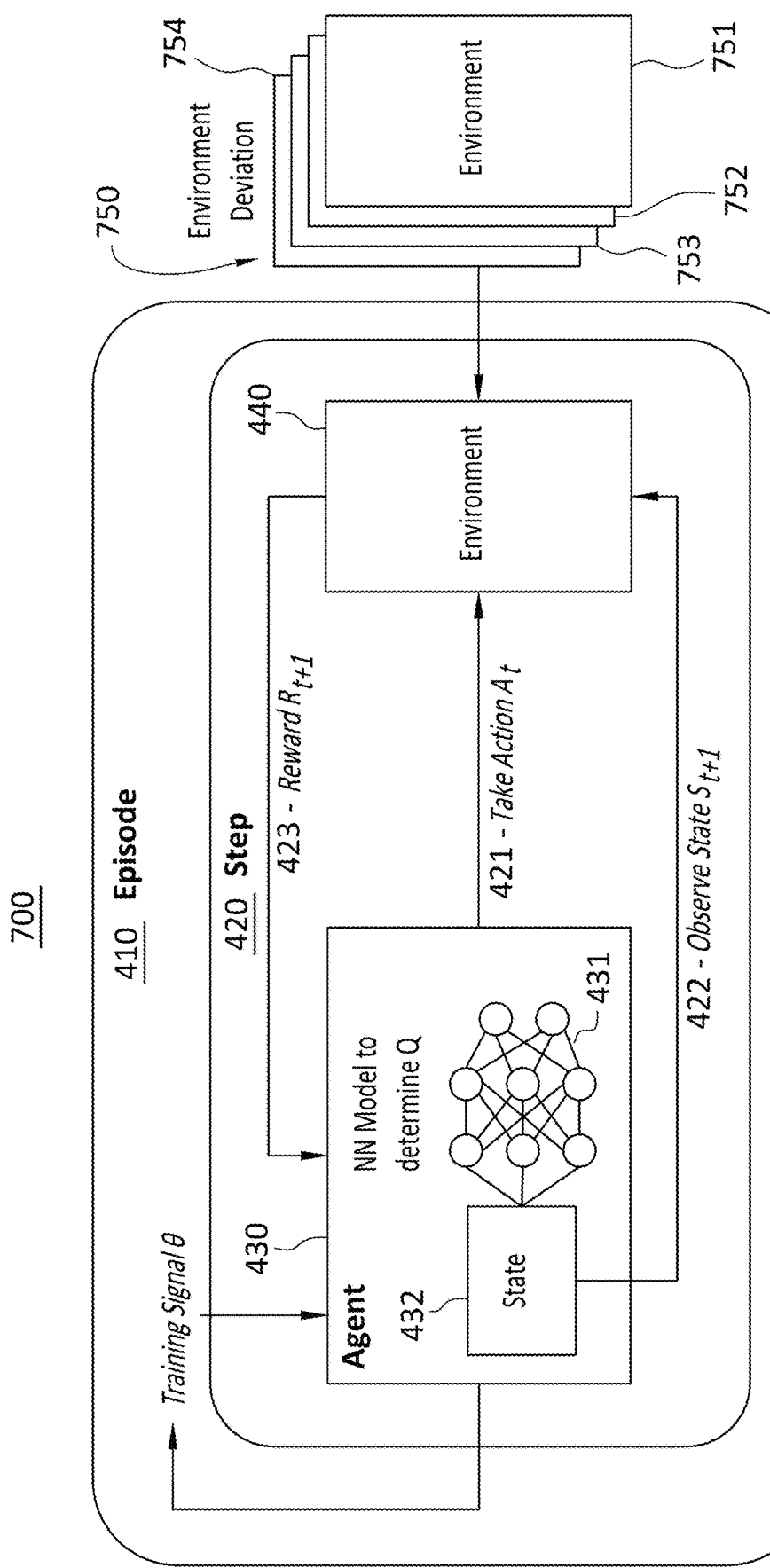
FIG. 7 illustrates a block diagram of a meta-reinforcement learning model, according to an embodiment.

In several embodiments, network control system 315 can allow the trained AI agent to integrate with network nodes, such as computer network nodes 330, in an SDN model. Nodes of computer network nodes 330 can include vendor controlled or open-source software, and can support the SDN protocol used by network control system 315. Network control system 315 can include an AI agent routing service 316, a control service 317, and/or a monitoring service 318. AI agent routing service 316 can include an AI agent that can trained to make routing decisions for computer network nodes 330. Control service 317 can be an SDN controller or cluster, in which the SDN controller can directly host the one or more agents, decentralized hierarchical agents can be hosted across multiple controllers, or fully distributed agents can be hosted across nodes, as shown in FIG. 7 and described below. The agent can use non-AI routing techniques, such as Shortest-Path Forwarding (SPF), in the event of AI agent unavailability and initial training. The agent can respond to routing requests from participating nodes of computer network nodes 330, and/or can proactively program local node route entries prior to requests. Network states, including topology, adjacencies, traffic, and performance data, can be observed via monitoring service 318. Monitoring service 318 can process and store the state for agent inference, future AI training, and auditability. Network control system 315 can support Application Programmable Interfaces (APIs) for programmatic interaction between itself and user interface system 310 and/or training system 320, within network control system 315 amongst its components, between itself and the nodes of computer network nodes 330, and/or for programmatic administrator access.

In many embodiments, user interface system 310 can permit user interaction with training system 320 and/or network control system 315. User interface system 310 can include a graphical user interface (GUI) service 311, a view service 312, a model service 313, and/or a management service 314. GUI service 311 can enable system and component administration, AI training, and model management. Users can view settings through view service 312 and control settings through management service 314 to update the model operating in model service 313. User interface system 310 can allow for direct configuration of RL rewards to train the AI network using declarative network policy, providing intent-based networking.

In a number of embodiments, user interface system 310 can read state information from network control system 315 and/or training system 320. User interface system 310 can provide modelling information to training system 320 and/or can provide management to network control system 315. Training system 320 can read state information from network control system 315, and can provide updates to network control system 315.

The services of user interface system 310, a network control system 315, and/or training system 320 can be modules of computing instructions (e.g., software modules) stored at non-transitory computer readable media that operate on one or more processors. In other embodiments, the services of user interface system 310, a network control system 315, and/or training system 320 can be implemented in hardware, or a combination of hardware and software. Additional details regarding user interface system 310, a network control system 315, and/or training system 320 and the services thereof are described below in further detail.

Training

Training system 320 can provide a robust environment to develop, train, test, and/or validate AI models used by network control system 315. Training system 320 can be managed through user interface 310 via API. Training system 320 does not require specialized hardware to function, but its efficiencies can be improved with high performance and parallel computing, including Graphical Processing Units (GPUs) and FPGA.

Figure 4:
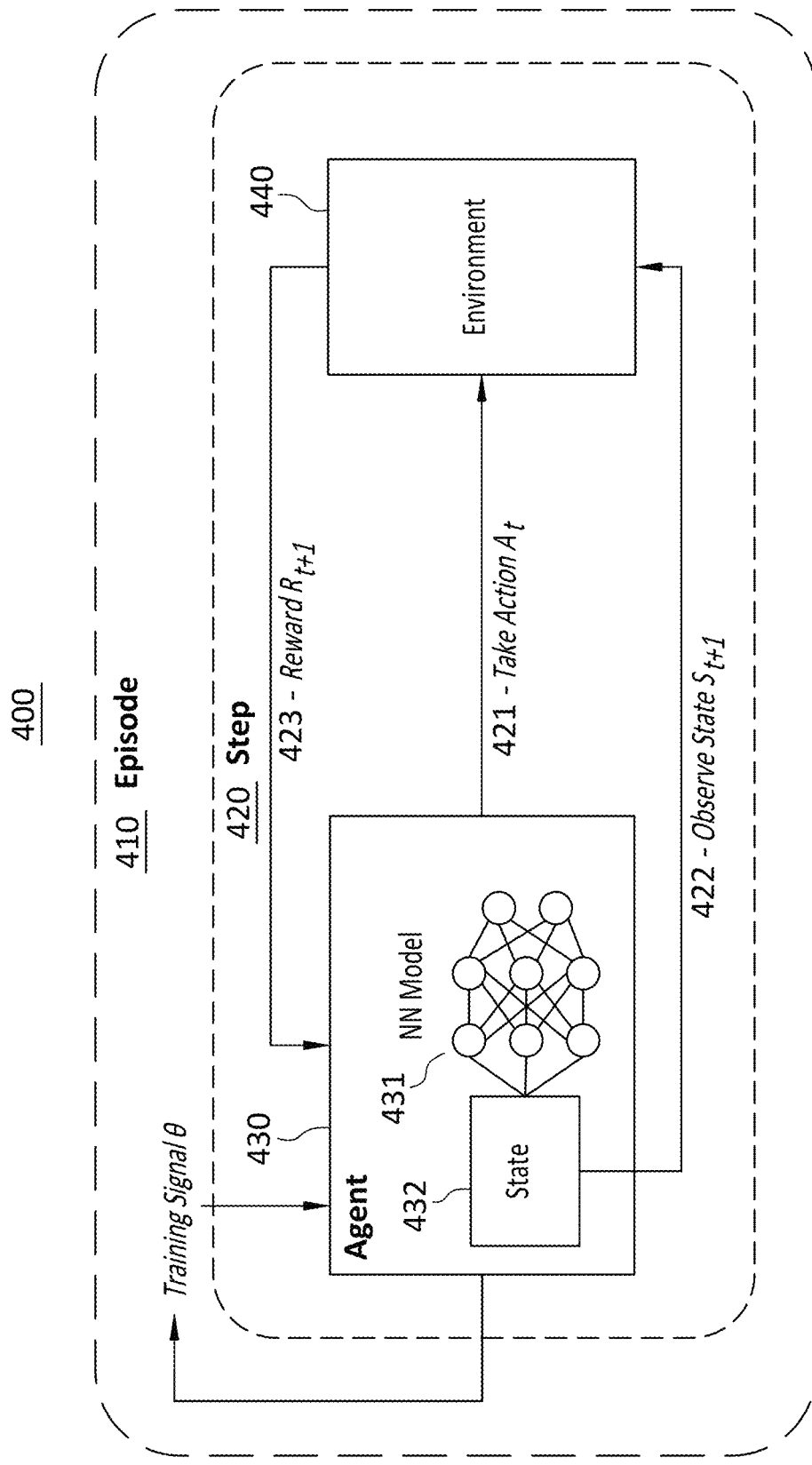
FIG. 4 illustrates a block diagram of a reinforcement learning model, according to an embodiment.

Turning ahead in the drawings, FIG. 4 illustrates a block diagram of a reinforcement learning model 400. RL model 400 is merely exemplary, and embodiments of the RL model are not limited to the embodiments presented herein. Training system 320 (FIG. 3) can use reinforcement learning, such as RL model 400, as an AI model training method. RL allows a model, such as a neural network 431, to be trained without dictating how the model should act. The model can learn via an agent process within an RL training episode, such as an episode 410. An AI agent, such as an agent 430, takes a series of actions (e.g., an action 421) within an episode (e.g., 410), known as steps (e.g., a step 420). Each action (e.g., 421) can be informed by observations of a state 432 of an environment 440 (e.g., a training or live environment of a computer network) and an expected reward (e.g., a reward 423). Observations (e.g., an observation 422) can be taken before and/or after an action (e.g., 421) to provide feedback to agent 430 as to their effectiveness. Observations (e.g., 422) can utilize sampling techniques for performance efficiencies. The actions of agent 430 can ultimately seek to achieve an optimal reward function dictated by policy or value in pursuit of the training objective. The optimal reward is sought throughout the training episode (e.g., 410) and is not relegated to within a step (e.g., 420), allowing the AI model to use foresight in its actions. The training signal θ indicates the start of a step within an episode, signaling that the agent can view observations and take an action.

As a simple example, an action (e.g., 421) can be choosing to route through the public internet or instead through a MPLS (Multiprotocol Label Switching) network. One or more observations (e.g., 422) of environment 440 can include a link identifier, a current bandwidth, and an available bandwidth in the network, and such state information can be stored in state 432. The reward (e.g., 423) can assign reward scores for various actions, such as a score of 1 for using MPLS, in which there is guaranteed success, a score of 3 for using the public internet with enough bandwidth, a score of −2 for using the public internet with limited bandwidth, and a score of −5 for an error in the network.

The actions of agent 430 can be defined by a tradeoff of reward optimization vs. exploration. For example, the shortest path through a network can provide the best reward, but the agent cannot know the shortest path until it has tried a multitude of potential paths. Value- and policy-based algorithms can achieve this result in different forms.

A policy-based model seeks to generate a trajectory τ to maximize objective J(τ) using policy function Tr. The policy function uses state s to produce an action a-74s). Policy-based algorithms include models such as Policy Gradient.

$$J(\tau) = \mathbb{E}_{\pi \sim \pi}[\Sigma_{t=0}^{R} \gamma^t r_t]$$

A value-based model learns value via state $V^\pi(s)$ or state-action pairs $Q^\pi(s,a)$. The Q method tends to be more efficient and is referred to as Deep-Q Reinforcement Learning in the context of RL. Algorithms such as Actor Critic and Proximal Policy Optimization (PPO) can combine value and policy models to further enhance training capabilities.

In many embodiments, system 300 (FIG. 3) can permit selection and implementation of different RL algorithms for neural network training via the user interface system 310 depending on the defined objective: value-based, policy-based, or combinations thereof. For complex objectives, such as different micro-objectives within network regions or very large networks, a Hierarchical Reinforcement Learning (HRL) approach can be used.

Figure 5:
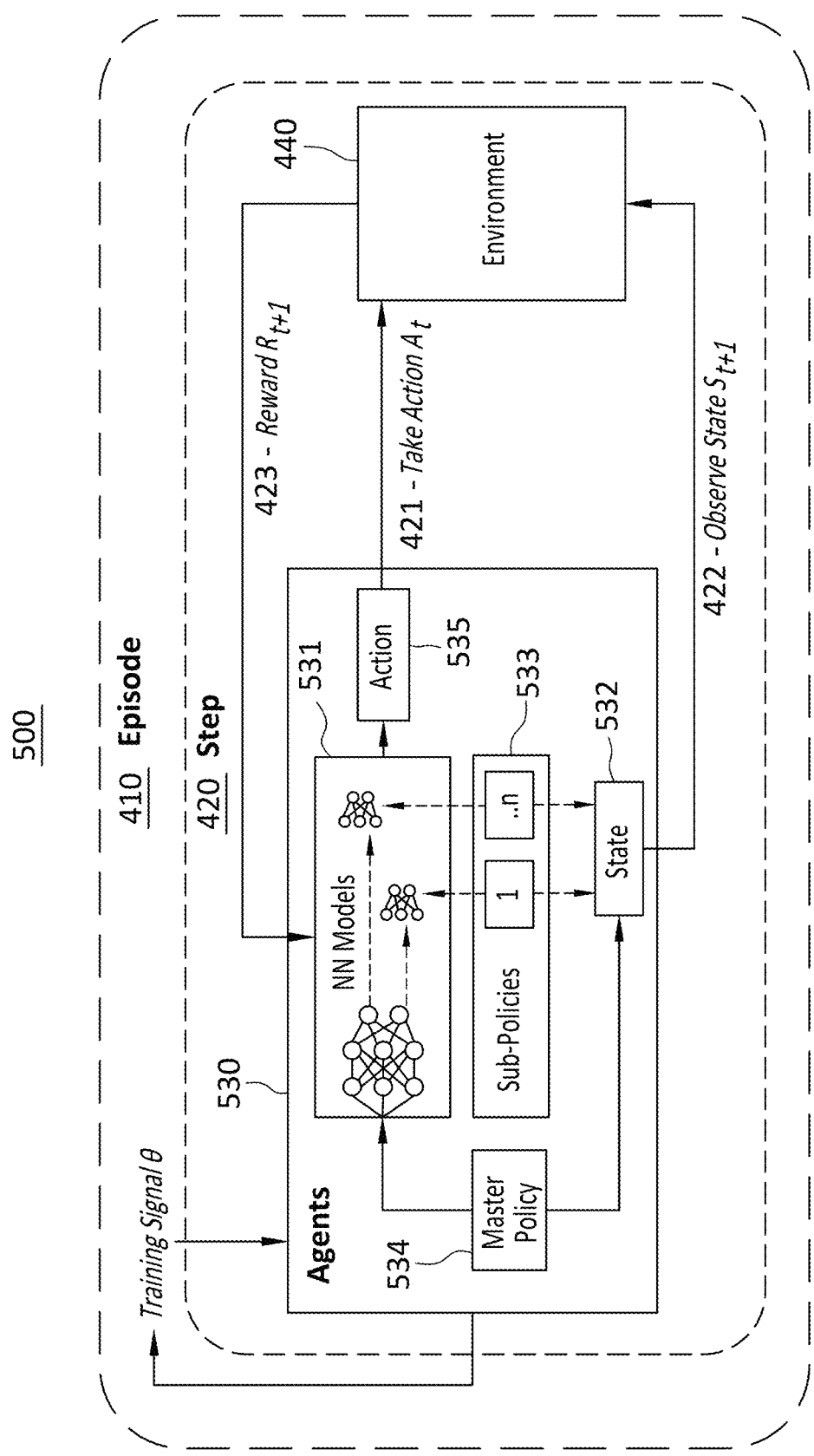
FIG. 5 illustrates a block diagram of a hierarchical reinforcement learning model.

Turning ahead in the drawings, FIG. 5 illustrates a block diagram of a hierarchical reinforcement learning model 500. HRL model 500 is merely exemplary, and embodiments of the HRL model are not limited to the embodiments presented herein. HRL model 500 can be similar to, and can includes several of the same aspects, as RL model 400 (FIG. 4), with some differences. For example, agent 430 (FIG. 4) can be replaced with agents 530, which can include neural network models 531 for a set of sub-policies 533 (e.g., from 1 to n) operating on a state 532 and a master policy 534 to produce an action 535.

In many embodiments, HRL model 500 can implement separate RL agents (e.g., 530) and/or can select appropriate RL training algorithms to support macro-objectives. Hierarchical agent domains, similar to routing domains, can be administratively defined. Additionally, hierarchical domains can be defined intelligently through a clustering AI, such as through k-means and Hierarchical Algorithmic Clustering (HAC), which can consider the strength and proximity of relationships amongst nodes.

Figure 13:
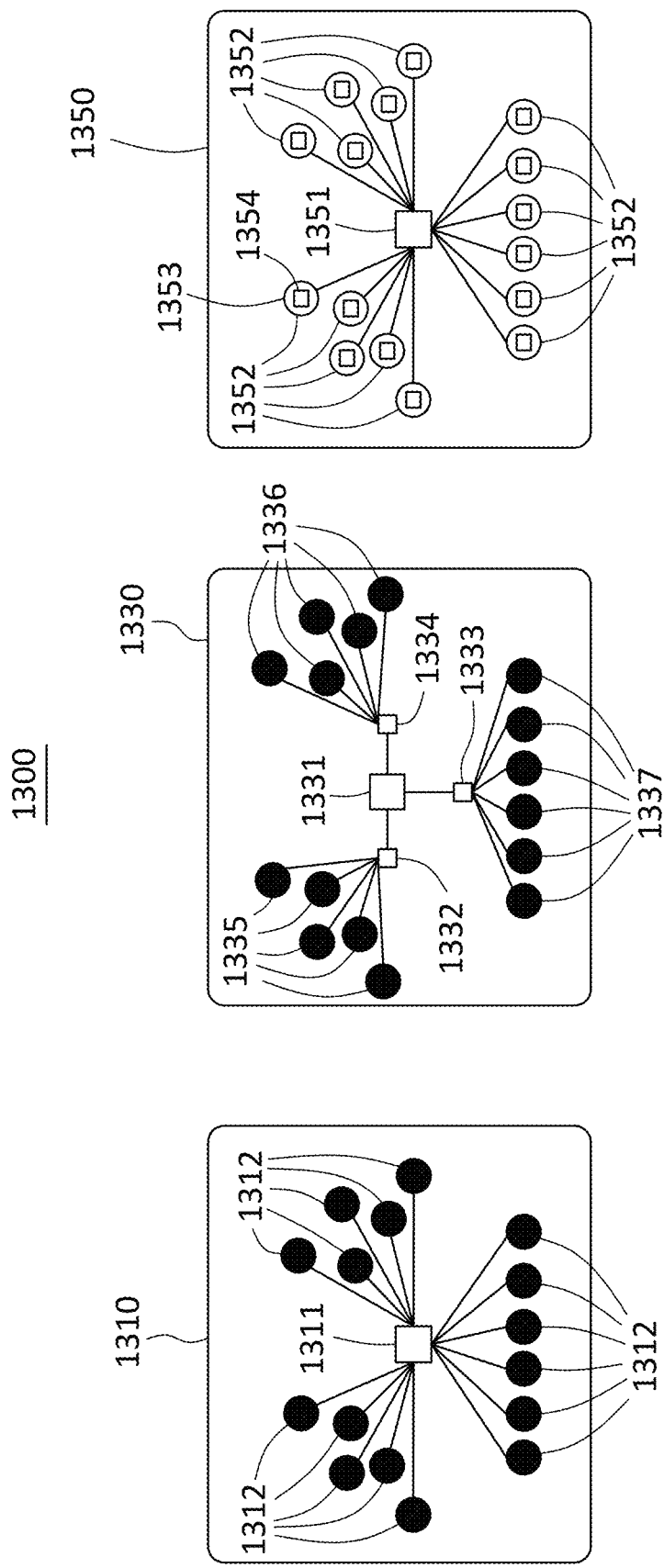
FIG. 13 illustrates block diagrams of network control system deployment models, including a centralized network control system deployment model, a decentralized network control system deployment model, and a distributed network control system deployment model.

HRL (e.g., HRL model 500) can provide additional model benefits beyond training effectiveness. For example, an HRL approach can be combined with the decentralized or distributed deployment models (as shown in FIG. 13 and described below) to allow multiple AI routing agents within the network control system 315 (FIG. 3). In a decentralized model, a parent agent and multiple child agents can be deployed based on clustered node regions, akin to having separate local routing processes for different routing domains. In a distributed model, participating nodes can run local trained agents throughout the entire network.

Digital Twin

Figure 6:
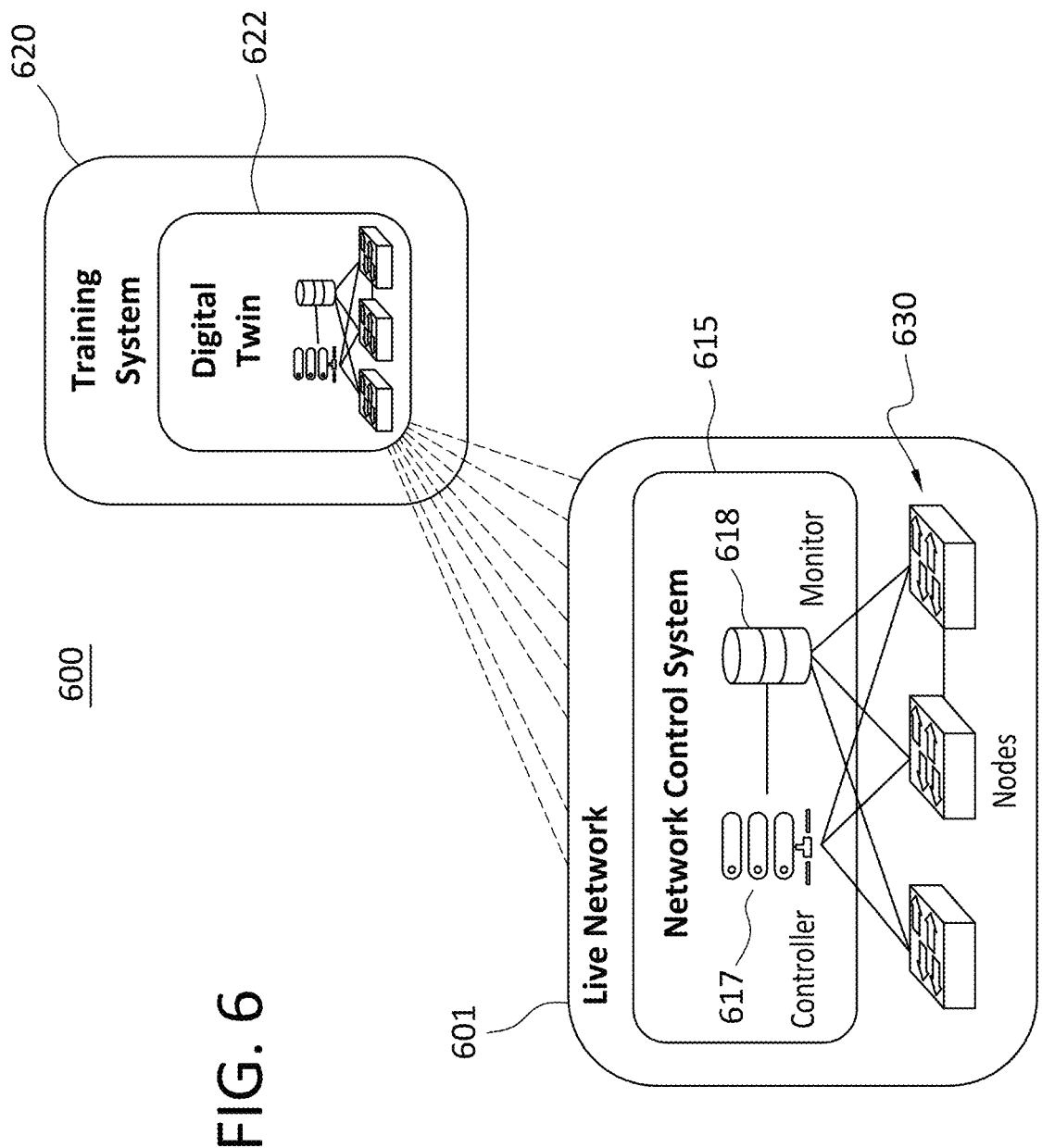
FIG. 6 illustrates a block diagram of a system that can be employed for AI-defined networking, according to an embodiment.

Turning ahead in the drawings, FIG. 6 illustrates a block diagram of a system 600 that can be employed for AI-defined networking, according to an embodiment. System 600 is merely exemplary and embodiments of the system are not limited to the embodiments presented herein. The system can be employed in many different embodiments or examples not specifically depicted or described herein. In some embodiments, certain elements, modules, or services of system 600 can perform various procedures, processes, and/or activities. In other embodiments, the procedures, processes, and/or activities can be performed by other suitable elements, modules, or services of system 600.

In many embodiments, in an AI-defined networking solution, RL algorithms can be used to train AI models to support network routing. The AI environment that the AI agent observes state from and takes action against can be a simulated network topology known as a digital twin, such as a digital twin 622 simulated within a training system 620. Training system 620 can be similar or identical to training system 320 (FIG. 3), and various elements of training system 620 can be similar or identical to various elements of training system 320 (FIG. 3). Digital twin 622 can be provided by a digital twin service, such as digital twin service 322 (FIG. 3).

Digital twin 622 can be a functional representation of a real, physical computer network. For example, digital twin 622 can be a simulated representation of live network 601. Live network 601 can include a network control system 615 and computer network nodes 630. Network control system 615 can be similar or identical to network control system 315 (FIG. 3), and various elements of network control system 615 can be similar or identical to various elements of network control system 315 (FIG. 3). For example, network control system 615 can include a controller 617 and a monitor 618. Controller 617 can be similar or identical to control service 317 (FIG. 3), and monitor 618 can be similar or identical to monitoring service 318 (FIG. 3). Computer network nodes 630 can be similar or identical to computer network nodes 330 (FIG. 3), and can includes nodes, such as routers and switches, and links between such nodes.

In many embodiments, the digital twin (e.g., 622) can be instantiated along with synthetic network traffic to create more realistic training scenarios. The digital twin network also is alterable as a training environment to create training scenarios, such as switches going offline, to realize the robust training capabilities of the AI model. Training scenarios involving environment deviation can be manually specified or automatically defined using methodologies such as Meta-Reinforcement Learning.

Turning ahead in the drawings, FIG. 7 illustrates a block diagram of a meta-reinforcement learning model 700. Meta-RL model 700 is merely exemplary, and embodiments of the meta-RL model are not limited to the embodiments presented herein. Meta-RL model 700 can be similar to, and can includes several of the same aspects, as RL model 400 (FIG. 4), with some differences. For example, an environment deviation set 750 can include environments, such as environments 751-754, that are variants of environment 440 that simulates live network 601 (FIG. 6), such as without certain nodes, with additional nodes, without certain links, with additional links, etc. Environment 440 can be replaced with one of the environments in environment deviation set 750 to train AI model 431 across the variants in environment deviation set 750.

Returning to FIG. 6, digital twin 622 can be generated manually or automatically. Manual creation can be performed through user interface system 310 (FIG. 3) and can include manual adjustments to an automatically created digital twin environment. Topologies used to build the digital twin can be saved in a database in system 300 (FIG. 3) to allow comparisons between past, present, and desired future state.

Building a digital twin (e.g., 622) through automation can begin with capturing the topology of an operational network. Topology discovery can be performed by network control system 615. Discovery can involve registering all participating network nodes (e.g., 630) to a central authority, such as an SDN controller service, to define the network domain. Details of each registered node can be collected into a database, including metadata, such as software versioning and hardware capabilities. The registered nodes then can solicit and report on neighbor adjacencies and link status, and their responses can be recorded in the same topology database. The resulting information can allow network control system 615 to build a logical representation of the network topology and determine if any changes have occurred since the last topology discovery. Topology change events can trigger a discovery request, as well as continuous discovery efforts at timed intervals. Previous topology captures of a network can be assessed to determine whether any material changes were made to the network, which can indicate whether to make full or incremental updates to the routing agent.

Once the network topology has been captured and stored by network control system 615, and it is established that a change has occurred, the new topology can be used by both network control system 615 and training system 620. Network control system 615 can utilize the discovered topology data to calculate fallback Shortest-Path First (SPF) based routing and inform the action space of a trained AI model, as described below. Training system 620 can separately access the topology data to build the digital twin that will become the RL training environment.

Training system 620 can access the stored network topology data to build a limited representative model of the network in a network simulator, in which the actual simulation does not include all aspects of the network and its supporting infrastructure, but instead includes the aspects that are relevant to the training objective. The simulation can support core routing, forwarding, and state reporting mechanisms, which for example can be simulated without fully replicating the operating systems of the nodes (e.g., 630). The digital twin simulation may support additional functionality depending on the training objective, such as utilizing virtual appliances that perform discrete actions (servers, firewalls, etc.) within the simulation. Limited representation further can allow the digital twin to utilize a scale ratio in the context of the simulation. For example, a real network may include 10 Gigabit-per-second (Gbps) links between all switches, but the digital twin simulation of that network may instead include 100 Megabit-per-second (Mbps) links using a 1:100 scale ratio. This technique may be leveraged to reduce the computational resources used for the digital twin and traffic generation subsystems.

The digital twin (e.g., 622) in its base form can support simulation of the same systems as exist within network control system 615. As network control system 615 uses an SDN controller (e.g., 617) and monitor (e.g., 618), the controller and monitor can be simulated within the digital twin (e.g., 622) along with the network nodes (e.g., 630) for training purposes. This setup allows the RL training to observe the state and take actions the same way as the live network to which the trained model will be deployed.

Once an accurate digital twin specification is built, it can be stored for future use by the digital twin simulator for the RL training environment. The digital twin simulator can function as the environment to the RL training process, which can be instantiated at the beginning of an RL training episode. In many cases, the entire digital twin simulator can be turned on at once using the limited representation and scale techniques previously described, along with parallel processing techniques such as computer clustering and scaling.

Traffic Generation

Training an RL routing model on a representative digital twin can allow the AI to learn behavior applicable to real-world topologies. Synthetic network traffic can be injected into the RL training episodes to improve the model such that it can optimize decisions in real-world scenarios.

Generating synthetic traffic (e.g., using network traffic service 323 (FIG. 3) can allow the AI-defined networking solution to train on a multitude of scenarios. Synthetic traffic can be generated within the digital twin model for direct training usage in RL agent actions and rewards, or as noise that serves as competing traffic against the legitimate training traffic. Generated synthetic traffic can be actual like-for-like traffic from a model or fuzzy (i.e., realistically altered) to avoid overfitting the training model. Fuzzy traffic can be created through small deviations from the original model (e.g., increasing traffic by 10%), sampling techniques like Monte Carlo, or through a more intelligent generative method (e.g., via Generative Adversarial Networks (GANs)).

Traffic models can be built from either historical data captured by a monitoring system or via a declarative model defined by a human or process. Synthetic traffic that feeds the model can be benign or detrimental in nature, either intentionally or unintentionally. Detrimental traffic can allow RL training to provide robust protections against malicious actions and undesired degradation scenarios. In summary, Table 1 below shows classification types of synthetic traffic.

TABLE 1

| Classification Categories | Classification Types | |
| --- | --- | --- |
| Usage | Training | Noise |
| Fit | Actual | Fuzzy |
| Origination | Historic | Declarative |
| Nature | Benign | Detrimental |
| Cause | Intentional | Unintentional |

Various types of synthetic traffic can be injected into an RL training episode or step within an episode via generation tools integrated within the digital twin environment. Episodic level traffic generation can allow a continual speaker to exist throughout training, such as a constant flood of competing for background noise. Traffic generation specific to a step can be generated regarding the action at hand, such as making a friendly traffic routing decision or stopping an adversarial traffic attack.

Synthetic traffic can be applied to the model via traffic profiles, which can define a set of behaviors within the training. Specifically, traffic profiles can be utilized to translate traffic data to instructions that can be used by the synthetic traffic generation tool to be applied during training. Traffic profiles can be generated either manually or automatically. Automatically generated traffic profiles can be further refined manually, as desired. Automated traffic profiles can be generated through the capture, storage, and analysis of real-world traffic conditions. An example of the creation and use of a traffic profile is shown in FIG. 8 and described below.

Figure 8:
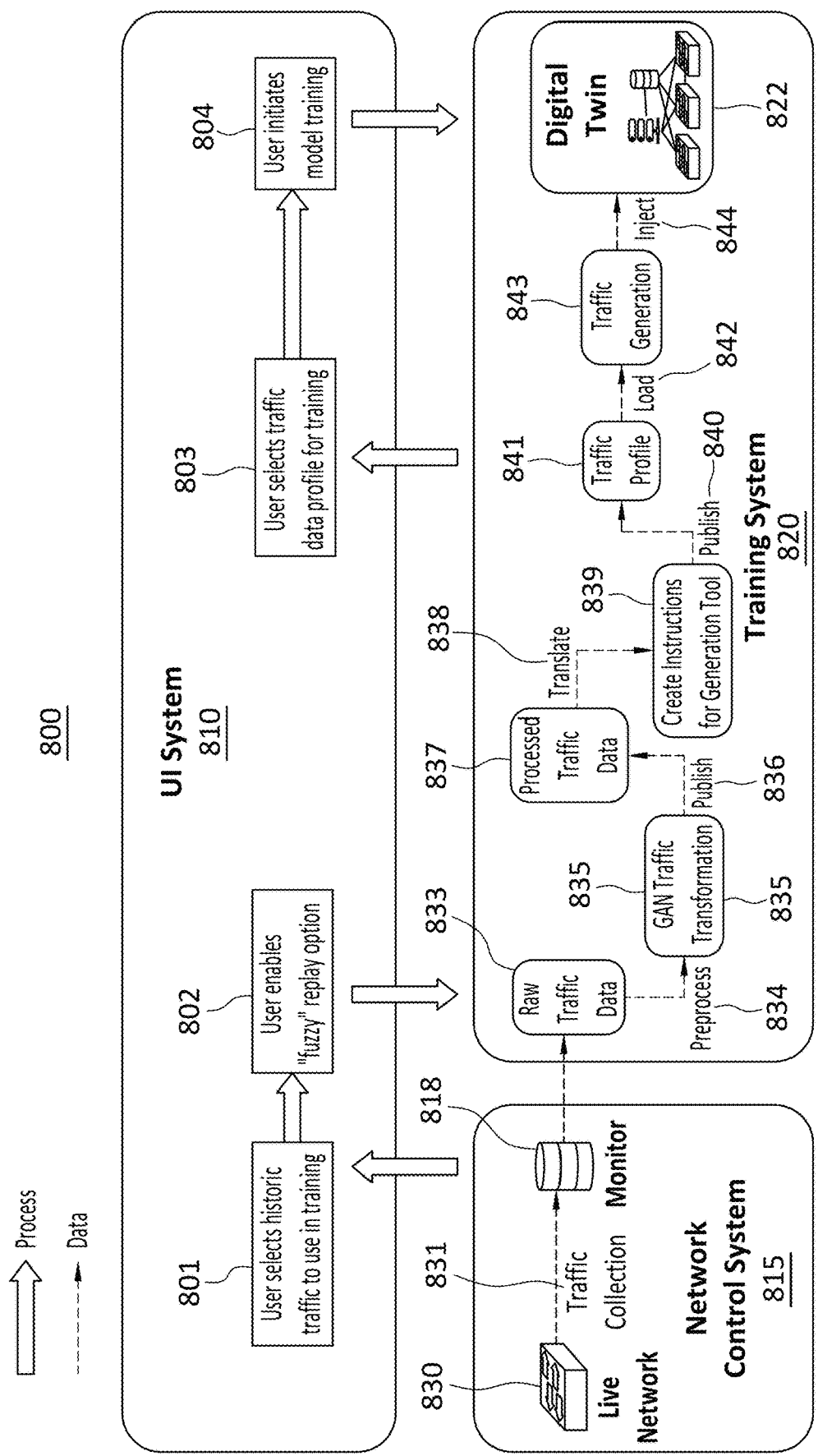
FIG. 8 illustrates a flow chart for a method for creating and using a traffic profile using a user interface system, and an associated flow of data in a network control system and a training system, according to an embodiment.

Turning ahead in the drawings, FIG. 8 illustrates a flow chart for a method 800 for creating and using a traffic profile using a user interface system 810, and an associated flow of data in a network control system 815 and a training system 820, according to an embodiment. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped.

User interface system 810 can be similar or identical to user interface system 310 (FIG. 3), and various elements of user interface system 810 can be similar or identical to various elements of user interface system 310 (FIG. 3). Network control system 815 can be similar or identical to network control system 315 (FIG. 3), and various elements of network control system 815 can be similar or identical to various elements of network control system 315 (FIG. 3). Network control system 815 can include a live network 830 and a monitor 818. Live network 830 can be similar or identical to computer network nodes 330 (FIG. 3), live network 601 (FIG. 6) and/or computer network nodes 630 (FIG. 6). Monitor 818 can be similar or identical to monitoring service 318 (FIG. 3) and/or monitor 618 (FIG. 6). Training system 820 can be similar or identical to training system 320 (FIG. 3), and various elements of training system 820 can be similar or identical to various elements of training system 320 (FIG. 3). Training system 820 can include digital twin 822. Digital twin 822 can be similar or identical to digital twin 622 (FIG. 6).

In a number of embodiments, as shown in FIG. 8, method 800 can begin with an activity 831 of traffic collection by monitor 818, which can collect live traffic from live network 830. This collected traffic can be stored as historic traffic for future use in training. Next, method 800 can include a user (e.g., 350 (FIG. 3)) employing user interface system 810 to perform an activity 810 of selecting historic traffic to use in training. Next, method 800 can include an activity 832 of transferring the selected historic traffic from monitor 818 in network control system 815 into training system 820 as raw traffic data 833. Next, method 800 can include activity 802 the user employing user interface system 810 of enabling a "fuzzy" replay option, which can indicate that the user desires for the traffic generation to have some variation from the actual collected traffic. Method 800 can continue with an activity 834 of preprocessing the raw data and an activity 835 of GAN traffic transformation to perform a fuzzy generation of synthetic traffic based on raw traffic data 833. Method 800 can continue with an activity 836 of publishing the synthetic traffic that was generated as processed traffic data 837. Next, method 800 can include an activity 838 of translating processed traffic data to create instructions 839 that can be used by the generation tool to be applied during training. Next, method 800 can include an activity 840 of publishing these instructions as a traffic profile 841. Method 800 can continue with an activity 803 of the user employing user interface system 810 to select a traffic profile for training (e.g., from among multiple traffic profiles that have been created). Next, method 800 can include an activity 842 of training system 820 loading the selected traffic profile (e.g., 841) to generate synthetic traffic 843. Method 800 can continue with an activity 804 of the user employing user interface system 810 to initiate model training on digital twin 822, and method 800 can continue with an activity 844 of injecting synthetic traffic 843 into digital twin 822 for training the RL model.

To capture network traffic, such as in activity 831, collectors can be implemented on participating nodes of live network 830, as taps on the network, or through a traffic collection service. The collectors can report all data about the traffic, but more commonly report metadata about the traffic to a central monitor. Collectors and the monitor also can support summarization, such as data collected over a time interval, and sampling techniques. Traffic capture can be done continuously, at regular sampling intervals, or upon request. Traffic captures are considered time-series data and can be stored by the monitor in a database.

Once traffic data has been collected and stored, it can be accessed by network control system 815 and training system 820. Network control system 815 can leverage traffic data for performance and auditability purposes. Training system 820 can use the traffic data to create synthetic traffic flows that can be injected into the digital twin training environment, as described above.

Traffic capture methods can depend on the state of the AI-defined networking solution. If the RL routing agent has been trained, it can be utilized as the network's primary routing mechanism. Network traffic can be captured after model publication for model quality control and future enhancement. If the RL routing agent has not been trained, but the AI-defined networking solution is implemented, network traffic can be captured for agent training. Meanwhile, the network can run a more straightforward mechanism, such as SPF. Alternatively, prior to the AI-defined networking solution implementation, traffic collector capabilities can be implemented in advance to provide training data to the model prior to implementation. This capability can allow customers to begin training AI agents against their target network topology before implementing the full AI-defined networking solution.

Scalability

In very large or complex scenarios, the computational overhead of training on a large simulated environment can lead to scaling issues. In these cases, various new approaches can be utilized to reduce the computational resources used for training. The AI-defined network solution can leverage scalability techniques, such as "rendering" and "reduction" in digital twin and synthetic traffic simulation, as described below.

Rendering can involve simulating parts of the environment at a given time instead of the entirety the environment. Similar to the visual concept of rendering within video games as the player advances within a map, rendering can allow the simulation to manifest portions of itself correlated to the observation space of the agent in training during a particular episodic step. Rendering can apply to the digital twin's network topology (e.g., the number of nodes instantiated) and/or the traffic generation (e.g., the traffic amongst those rendered nodes). Rendering distance, or the observed visibility distance into the training environment from the agent's perspective, can be defined via static administrative distance or correlation algorithm. The distance correlation algorithm can determine the distance scope in terms of observation correlation to action, which can be a configurable attribute of the algorithm. Using a limited lens simulation via rendering, the agent can be trained more efficiently while maintaining the integrity of the training.

Figure 9:
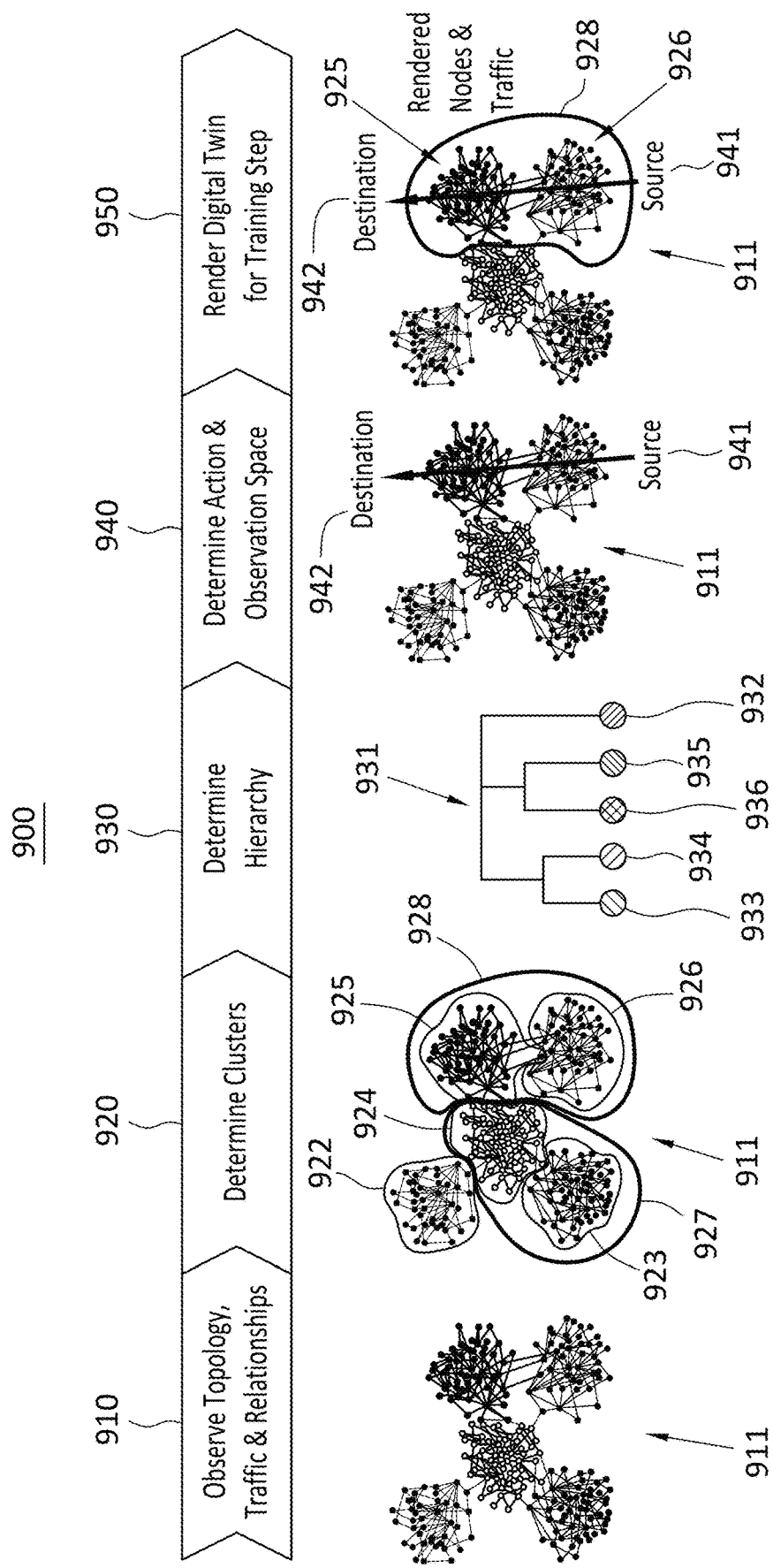
FIG. 9 illustrates a flow chart for a method for rendering using hierarchical algorithmic clustering, according to an embodiment.

Turning ahead in the drawings, FIG. 9 illustrates a flow chart for a method 900 for rendering using hierarchical algorithmic clustering (HAC), according to an embodiment. Method 900 is merely exemplary and is not limited to the embodiments presented herein. Method 800 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. Method 900 can be performed on a large digital twin simulation (e.g., digital twin 622 (FIG. 6)) run on a training system (e.g., training system 620 (FIG. 6)).

In a number of embodiments, as shown in FIG. 9, method 900 can begin with an activity 910 of observing network information about a physical network. The network information can information can include the network topology, traffic information, and/or relationships between links and nodes in the physical network. The network topology can be accessible to the rendering process, either through dynamic discovery of a network or human configured topology via user interface system 310 (FIG. 3). An administrator can select the saved network topology to enable rendering for training, which can enable rendering through training settings. During the training process, the target topology can be set as the initial RL environment training space. For example, a training network 911 can be observed. However, when training starts, not all of the network nodes and links are immediately simulated. Instead, an HAC clustering method can be utilized to determine which objects to turn on at which point in the training episode.

In several embodiments, method 900 can continue with an activity 920 or determining clusters. The Hierarchical Algorithmic Clustering algorithm can be executed after training begins, but before the first step is executed. The HAC process can begin by identifying the nodes and links within a network, and the strength of relationships between those nodes and links for first-order clustering. Relationship strength can be influenced primarily by node proximity (e.g., how close nodes are logically to each other,), connection frequency and volume (e.g., how often is traffic sent between nodes and by what magnitude), geographic proximity (e.g., how close nodes are physically in the world), link speed, and/or latency between nodes. For example, training network 911 can include first-order clusters 922-926. The result of HAC clustering can be a grouping of nodes, and their dependencies amongst each other.

After an initial cluster definition is obtained, relationships and dependencies within amongst the clusters can be determined. Clusters can be effectively grouped by the strength of their relationship between each other, via similar proximity, frequency, volume, and/or performance metrics. An additional concept in HAC versus simply clustering first-order clusters is the idea of relationship dependency. First-order clusters relationships are captured, but the nature of those relationships are also significant. For example, two data centers in the western US may be their own independent first-order clusters of nodes and links. A second-order hierarchical cluster can include both of those western data center objects, while there is a different cluster for data centers from the eastern US. Multiple first-order clusters can exist within a second-order cluster, and can share a dependency on the second-order cluster. In this example, the local data centers may ultimately share a dedicated communications link between regions. For example, training network 911 can include a second-order cluster 927 that includes first-order clusters 923 and 924, and a second-order cluster 928 that includes first-order clusters 925 and 926.

In a number of embodiments, method 900 can continue with an activity 930 of determining a hierarchy of the cluster, such as clusters 932-936 in a hierarchy 931. Clusters 932-936 can correspond to first-order clusters 922-926, respectively. Second-order cluster 927 can be represented by a grouping of clusters 933 and 934 in hierarchy 931. Second-order cluster 928 can be represented by a grouping of clusters 935 and 936 in hierarchy 931.

In several embodiments, method 900 can continue with an activity 940 of determining an action and observation space. For each training step, the training process can determine which of the object clusters are relevant to the step. In several embodiments, method 900 can continue with an activity 950 of rending the digital twin for a training step. For each training step, the training process can simulate the object clusters that are relevant for the steps. For example, if two clustered regions are strongly correlated to the action space of the training step, nodes within those two regions can be "turned on" or enabled for the training step, thus enabling their associated links. As shown in FIG. 9, second-order cluster 928, which includes first-order clusters 925 and 926, can be been selected for simulation rendering. This selection can be based on a host in first-order cluster 916 attempting to communicate with a host in first-order cluster 915 in a particular training step to communicate from source 941 to destination 942. Clusters that have a low correlation (e.g., first-order clusters 922-924) to the training step are not enabled, which can significantly reduce use of computational resources for the simulation. Clusters that are not enabled can still provide observations to the environment, such as injecting traffic to an enabled cluster, but this can be done via summarization at the cluster boundary instead of direct simulation. Outputs from the HAC algorithm can be the clusters of nodes and links, as well as cluster relationships, that are used for rendering decisions in training and domain definition in Hierarchical Reinforcement Learning.

Another scalability technique can include reduction. Reduction can involve decreasing the computational resources used for the simulation through a scale ratio. The scale ratio can be defined by the simulated network's capabilities compared to the live network capabilities. For example, a 1 Gigabit per second (Gbps) simulated network for training that mimics all other aspects of a live 100 Gbps physical network, except speed, would be a 1:100 scale ratio. In order to achieve scale, the configured digital twin's interconnects can be set to the 1/100th scale of the live network speed, as would the synthetic traffic within the simulation. This method can involve some adaptation to the training scenario, depending on scale, as elements of networking protocols can vary with the configured speed. A reduction approach can be appropriate for decreasing computational resources used for digital twin training scenarios. Reduction can be usable independently, or in conjunction with rendering. In smaller digital twin simulations, reduction can provide sufficient computational savings without using rendering.

Rendering and reduction can reduce the computational resources used to run a training simulation, but do not directly assist in the scalability of the AI-defined network solution for large deployment environments. In large deployment environments, the Hierarchical Reinforcement Learning approach described in the training section can provide scalability and/or can be combined with the same HAC clustering applied to simulations. This technique permits the training and distribution of trained agents in a federated manner amongst routing domains.

Training Scenarios

In several embodiments, by combining the elements of a digital twin network topology, synthetic traffic generation, and AI policy, an RL episode can be created to train an AI model for routing. The combination of these elements can allow for training scenarios. Training scenarios can be similar to synthetic traffic generation scenarios, in that they can embody multiple types of positive and negative conditions. A positive condition can include introducing a new host or network node, improvement to throughput, or an otherwise favorable change to network conditions. Negative scenarios can include unintentional or intentional degradation of the network via failure conditions or bad actor attacks, respectively.

In some embodiments, the AI-defined network solution can utilize custom training scenarios to avoid overfitting training models and/or tailor AI agent training for user-specific needs. In a number of embodiments, training scenarios can aim to address business problems. A training scenario can be configured to replicate normal operational change conditions, including adding or removing a node. Alternatively, the training scenario can reflect unanticipated changes, such as a bad actor attack or complex failure condition. These options can be defined through user interface system 310 (FIG. 3). In some embodiments, training scenarios can include allowing an administrator to simulate changes in advance of their realization. This feature can allow the AI-defined network solution to be pre-trained before solution installation or alteration. It also can allow administrators to replay historical events to troubleshoot and/or optimize.

It can be challenging to define unknown degradation scenarios administratively. In several embodiments, the AI-defined network solution can solve this problem through the use of autonomous scenario programming. Degradation scenarios, for example, can be defined via the magnitude of their impact. A high-impact scenario can include multiple, repetitive node failures in the network via accident or purpose. A low-impact scenario can include a single, recoverable failure, such as link degradation through normal operation. Regardless of the scenario selected, the administrator does not need to define every condition. Degradation to the environment can be user-defined or automated in nature. Automation can include synthetic replication of pre-defined scenarios, to include fingerprinted security attacks, historical events, and traffic profiles.

In many embodiments, training scenarios can include the ability to optimize scenarios based on policy. In this case, the policy can be the business policy that can apply to network behavior specifications, as defined by rewards configured through user interface system 310 (FIG. 3). Rewards can be a number that describes how positive or negative an outcome is for the RL agent process throughout a training scenario. Policy defined by user interface system 310 (FIG. 3) can be mapped to rewards used in training the AI agent. Policy examples can include business goals, such as optimizing video traffic, ensuring certain applications are always available, complying with government policy, preventing attacks, or other suitable policies. Examples of policy to reward mappings are shown below in Table 2

TABLE 2

| Example | Business Policy | Network Policy | AI Rewards |
|---|---|---|---|
| 1 | Business continuity | Reachability and reliability | Positive reward for min drop and maximum delivery |
| 2 | User experience | Application performance | Positive reward for maximum throughput, minimum latency, and minimum jitter |
| 3 | Policy compliance | Traffic segmentation | Negative reward path selection between defined segments |
| 4 | Risk mitigation | Security | Negative reward for successful attacks |

Application Awareness

The AI-defined network solution can provide robust native training capabilities for network traffic at Open Systems Interconnection (OSI) layers 2-4. This is due to AI training based on flows, including source/destination addresses and the traffic type, typically derived from layer 4 port and/or protocol specification within a packet header. However, the traffic capture and generation capabilities within the AI-defined network solution can provide robust capabilities above OSI layer 4 when utilizing an intelligent application classification methodology.

Intelligent application classification can be performed through fingerprinting techniques on traffic data derived from network control system 315 (FIG. 3), which can go beyond simple flow identification. Identification can take observations from traffic collection, deep packet inspections, behavior analysis such as from traffic size and frequency, and/or host-based reporting using a dedicated agent. Identification can be performed in a semi-supervised manner, allowing for supervised and unsupervised learning methods. Classification can be supervised or unsupervised. Unsupervised classification can be performed on previously trained identification schemas for known applications. Supervised classification can involve a human determining the identity and label, and metadata of an application. In combination, a semi-supervised approach can allow classification to be initiated from a model on known applications, with the ability for administrators to override the initial classification and associated metadata for the application.

Application identification within the AI-defined network solution can utilize an application tiering approach. An application tier can represent a component of a broader application, which can be independently identified from the application. For example, a typical three-tier application might include a web server front end, an application accessed by the web server, and a database backend that supports the application and web server. All three components, or tiers, comprise the application identity that receives its own classification. Each tier of web, application, and database in this example is a separate tier identity that is classified both independently and in relation to the application identity.

Figure 10:
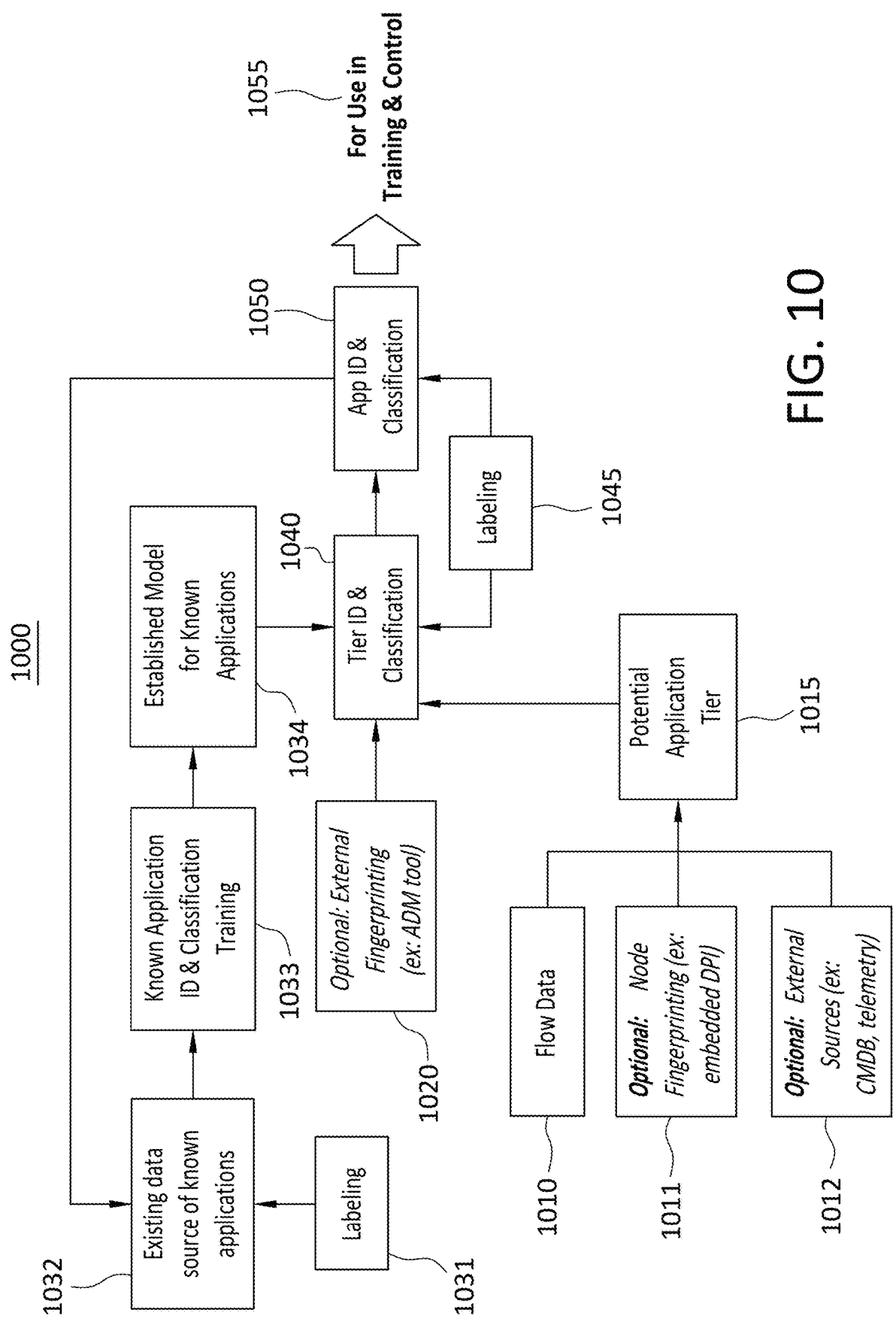
FIG. 10 illustrates a flow chart for a method for application and tier classification, according to an embodiment.

Turning ahead in the drawings, FIG. 10 illustrates a flow chart for a method 1000 for application and tier classification, according to an embodiment. Method 1000 is merely exemplary and is not limited to the embodiments presented herein. Method 1000 can be employed in many different embodiments or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped.

In a number of embodiments, as shown in FIG. 10, method 1000 can begin with data collection, such as an activity 1010 of collecting flow data. Traffic flow data can be collected using monitoring service 318 (FIG. 3) of network control system 315 (FIG. 3), as reported by each node of computer network nodes 330 (FIG. 3). Traffic data can include source address, destination address and/or protocol fields. Basic traffic identity can be derived from the protocol data within a flow, which can allow for simple traffic identity. The source and destination fields for the flow can allow further inspection of patterns associated with the traffic that can be used to help determine a potential tier identity through a neural network. For example, traffic that is consistently sent from multiple hosts to a single host using a well-known database access port could indicate that traffic matching that flow identity could be a candidate application tier.

Traffic data can optionally by augmented by host-based identification methods when it is reported, such as in activities 1011 and 1012. Several network equipment manufacturers provide local application or traffic identification with embedded fingerprinting mechanisms such as through Deep Packet Inspection (DPI), which can be collected in activity 1011. If this support is available to a node within the AI-defined network, the flow data it reports can include classification information that can be directly used in building a candidate application tier. Traffic data may also be correlated to various network management solutions, such as a Configuration Management Database (CMDB), which can provide additional information for application and/or tier identification, which can be collected in activity 1012. For example, a CMDB may contain identifying information for an application or service associated with an address in a flow, which can be queried by the application identification mechanism for inclusion in identification mechanisms.

Once a pattern has been identified through one or more of the traffic collection sources, it can be stored in an activity 1015 as a candidate in a list of potential application tiers. Each candidate tier can then be inspected in an activity 1040 to determine a tier classification. Tier classification mechanisms can begin through an automated process wherein candidates can be compared to previous classified application or tier identities. As previously classified applications consider flow patterns as a dimension to identification, matching can be based on a probabilistic, instead of deterministic, correlation. If a match is found to a known application, the candidate tier can be labeled accordingly, in an activity 1045. If no match is found or there is a low probability of previous correlation, the candidate tier can be flagged for administrative definition. An administrator then can label the tier and/or can override the initial classification label, in an activity 1031. Classification labels and relationship identification also can include metadata about the data, such as a description of the application or tier. Relationships between tiers and applications can be derived in a similar manner. For example, manual labelling can be used based on an existing source of known applications in activity 1032, after which an activity 1033 of training known application identities and classifications can be performed, followed by an activity 1034 of generating an established model for known applications, which can be used in activity 1040 of determining tier identities and classifications.

In certain network architectures, it may be possible to collect additional traffic data beyond what is available within flow reporting mechanisms. Specifically, if a network architecture utilizes reporting full traffic replays (including data fields) to a monitoring appliance, it can be possible to perform DPI to look beyond typical flow metadata. DPI can permit pattern analysis and identification of a full datagram, not just metadata from about the traffic. To perform DPI from a central point in the network, the AI-defined network solution can apply a similar identification and classification mechanism to the traffic, but also can inspect packet contents using a neural network to identify patterns in the datagram consistent with an application or tier. The AI-defined network solution can optionally use an external collection and identification service in this architecture, in an activity 1020, and/or can use the service's suggested classification as a dimension to prospective application or tier candidates.

Once identified and classified, an application profile can be created in an activity 1050 for use in AI agent training in an activity 1055. The application profile can include the instructions for generating a traffic profile, which itself contains the instructions for injecting synthetic traffic into the digital twin. An application profile can be different from a traffic profile, as an application profile can include behavioral characteristics of the application, such as an order of operations in traffic for tiers dependent on the application. In the example of a user accessing a web app with a subsequent database call, the application profile would define user-to-web-application traffic, then web-application-to-database traffic, as separate actions that are populated to the traffic profile as subsequent time series traffic activities. The subsequent traffic profile can then be usable in the synthetic traffic generation service as training or noise traffic in support of business specifications. This approach can allow a training scenario to be configured specifically to an application's performance, including per-application rewards that can be defined through user interface system 310 (FIG. 3).

Figure 11:
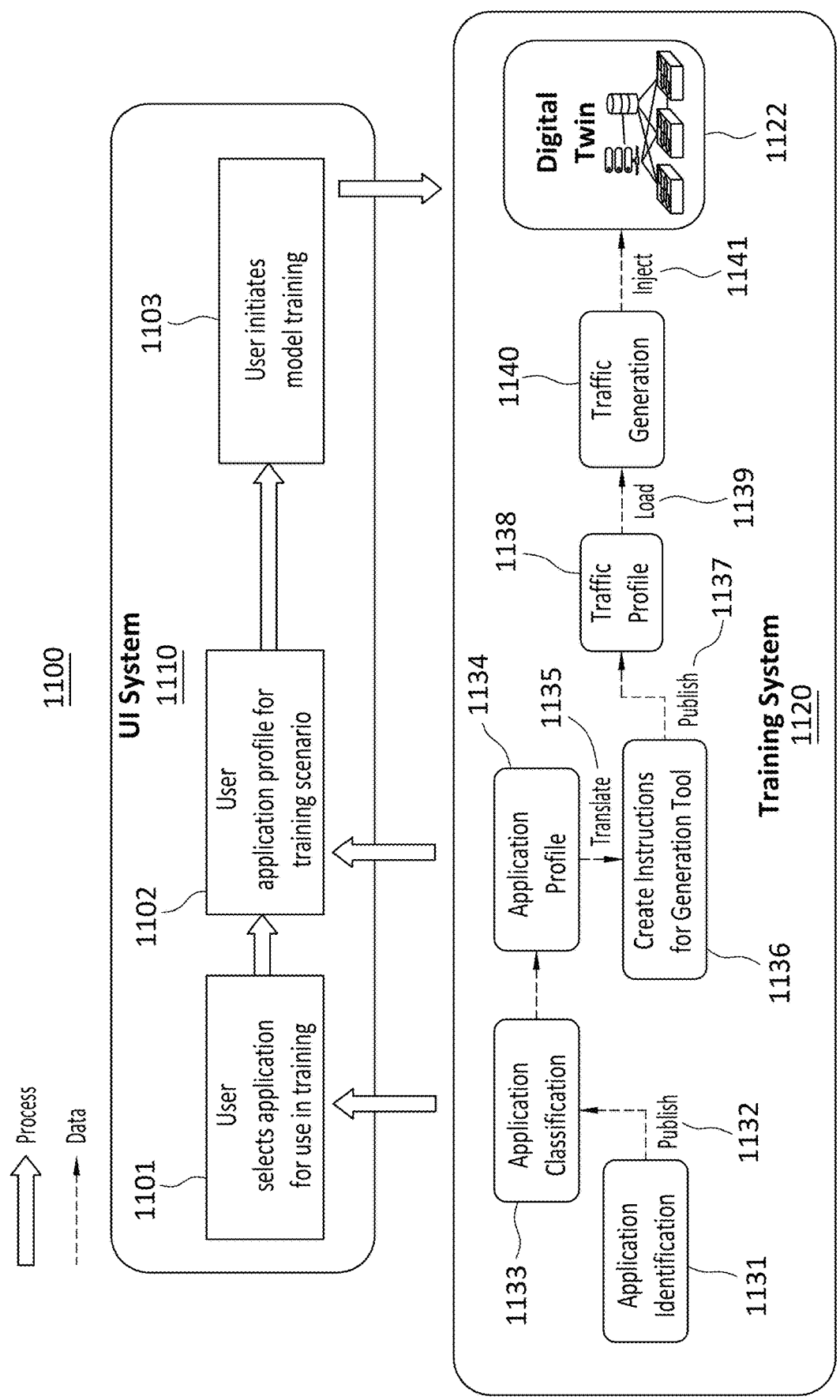
FIG. 11 illustrates a flow chart for a method for training a digital twin with an application profile, using a user interface system, and an associated flow of data in a training system, according to an embodiment.

Turning ahead in the drawings, FIG. 11 illustrates a flow chart for a method 1100 for training a digital twin 1122 with an application profile, using a user interface system 1110, and an associated flow of data in a training system 1120, according to an embodiment. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped.

User interface system 1110 can be similar or identical to user interface system 310 (FIG. 3), and various elements of user interface system 1110 can be similar or identical to various elements of user interface system 310 (FIG. 3). Training system 1120 can be similar or identical to training system 320 (FIG. 3), and various elements of training system 1120 can be similar or identical to various elements of training system 320 (FIG. 3). Training system 1120 can include digital twin 1122. Digital twin 1122 can be similar or identical to digital twin 622 (FIG. 6).

In a number of embodiments, as shown in FIG. 11, method 1100 can begin with training system 1120 performing an activity 1131 of application identification, which can be similar or identical as described above. Next method 1100 can include an activity 1132 of publishing the application identification, which can be used in an activity 1133 of application of classification. Next, method 1100 can include a user (e.g., 350 (FIG. 3)) employing user interface system 1110 to perform an activity 1101 of selecting an application for use in training, follow by an activity 1102 of selecting an application profile for a training scenario. Method 110 can include an activity 1134 of training system 1120 using the selected application profile. Next, method 1100 can include an activity 1135 of translating the application profile to create instructions 1136 that can be used by the traffic generation tool to be applied during training. Next, method 1100 can include an activity 1137 of publishing these instructions as a traffic profile 1138. Next, method 1100 can include an activity 1139 of training system 1120 loading the traffic profile to generate synthetic traffic 1140. Method 1100 can continue with an activity 1103 of the user employing user interface system 1110 to initiate model training on digital twin 1122, and method 1100 can continue with an activity 1141 of injecting synthetic traffic 1140 into digital twin 1122 for training the RL model.

Security & Segmentation

In a number of embodiments, the RL method used to train the AI-defined network solution can lend itself to greater application beyond network routing. For example, the visibility of network control system 315 (FIG. 3) into network actions and observations can allow training to include non-routing aspects that apply to security. The RL routing agent can, for example, be rewarded for properly mitigating network-based attacks such as Denial of Service attacks.

The AI-defined network solution can allow for training against bad-actor attacks through its policy-based reward functionality. Declarative administrative policy can allow the rewards that go into agent training to include a security focus, such as preventing attacks. This approach can allow the AI-defined network solution to provide proactive and/or robust protections against attacks that would otherwise involve extensive configuration in a traditional network. In the context of other AI-defined networking components, training against a bad-actor attack can be performed similarly to application-aware training, with the opposite goal. The AI agent can optimize the mitigation of bad-actor attacks. This training can allow the AI-defined network solution to respond to attacks in real-time, adapt quickly, and/or minimize impact to the network.

Training against bad-actor attacks can involve an additional automation component within the AI-defined network solution. An automated attacking service (e.g., penetration test) can be used against the digital twin training environment within a training scenario, with a post-routing monitoring mechanism used to determine attack success or failure and provide reward feedback to the agent in training. When reduced to a single node network within the digital twin, this functionality can act as a firewall or Intrusion Prevention Service (IPS) that can provide enhanced protection to the network. Applied to a multi-node network, the network itself can be trained to provide similar security mechanisms.

In several embodiments, administrative policies also can be incorporated into the security model to allow for segmentation. Segmentation can support the security concept that certain endpoints should not communicate directly with each other, or in certain cases, communicate across the same path. Segmentation can be incorporated into the AI-defined network solution via definition in training with a default-open or default-closed approach. In a default-open approach, all traffic can reach all destinations in RL agent training, and the RL agent can optimize path selection. To segment traffic, a specific policy can be implemented that defines a severe negative reward for permitting communication between certain hosts or across certain paths. In a default-closed approach, the training scenario can be configured with a severe negative reward for all communication, such as a reward below a certain negative threshold, which can effectively create universal segmentation. To allow endpoints to communicate, positive rewards can be defined for endpoint combinations.

Data & Model Management

Figure 12:
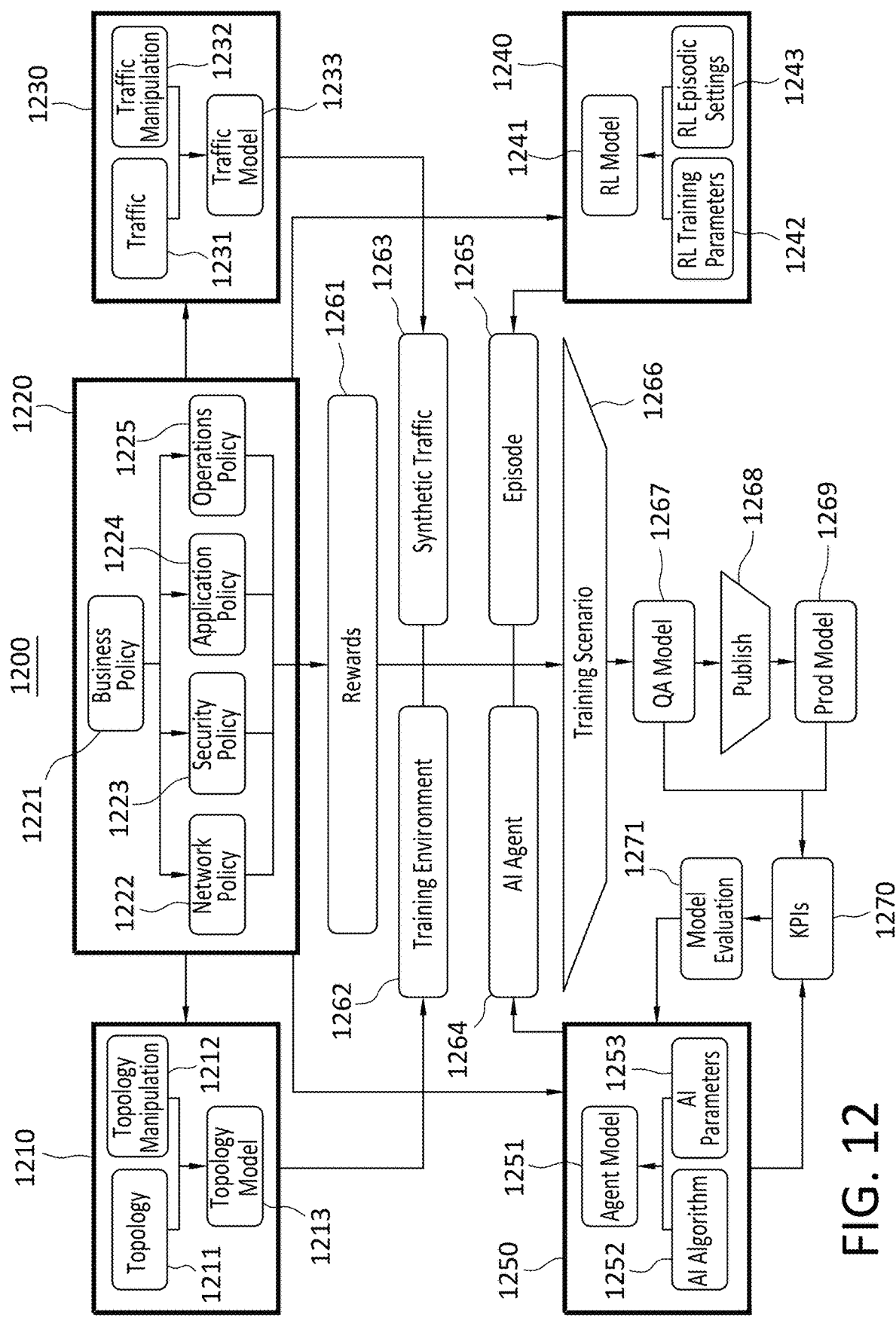
FIG. 12 illustrates a block diagram of an AI model lifecycle, according to any embodiment.

Turning ahead in the drawings, FIG. 12 illustrates a block diagram of an AI model lifecycle 1200. AI model lifecycle 1200 is merely exemplary, and embodiments of the AI model lifecycle are not limited to the embodiments presented herein. AI model lifecycle 1200 can include policies 1220, such as business policy 1221, network policy 1222, security policy 1223, application policy 1224, and/or operations policy 1225. AI model lifecycle 1200 also can include topology modeling 1210, which can include obtaining information about a network topology 1211, performing topology manipulation 1212, and generating a topology model 1213. Topology modeling 1210 can receive inputs from policies 1220 for generating topology model 1213. AI model lifecycle 1200 also can include traffic modeling 1230, which can include obtaining information about traffic 1231, performing traffic manipulation 1232, and generating a traffic model 1233. Traffic modeling 1230 can receive inputs from policies 1220 for generating traffic model 1233. AI model lifecycle 1200 also can include RL modeling 1240, which can include defining an RL training parameters 1242, defining RL episodic settings 1243, and generating an RL model 1241. RL modeling 1240 can receive inputs from policies 1220 for generating RL model 1241. AI model lifecycle 1200 also can include AI agent modeling 1250, which can include defining an AI algorithm 1252 and AI parameters 1253, and generating an AI agent model 1251. AI agent modeling 1250 can receive inputs from policies 1220 for generating AI agent model 1251, as well as model evaluation information 1271, as described below.

In a number of embodiments, policies 1220 can be used to define rewards 1261, topology modeling 1210 can be used to define a training environment 1262, traffic modeling 1230 can be used to define synthetic traffic 1263, RL modeling 1240 can be used to define an episode 1265, and/or AI modeling 1250 can be used to define an AI agent 1264. Rewards 1261, training environment 1262, synthetic traffic 1263, AI agent 1264, and/or episode 1265 can be used in a training scenario 1266 to train AI agent 1264. A quality assurance (QA) model 1267 can be used to evaluate the trained AI agent, which can then be published 1268 to a production model 1269 for routing on a real network. Performance information from quality assurance model 1267 and/or production model 1269 can be used to measure key performance indicators (KPIs), which can be evaluated to further refine AI modeling 1250.

In many embodiments, the AI-defined network solution can utilize a methodology known as Machine Learning Operations (MLOps) to achieve auditability, visibility, and/or reproducibility throughout the AI development lifecycle. The MLOps approach can treat AI models, code, and data as Configuration Items (CIs) throughout training, testing, validation, deployment, and/or operations. With these principles in mind, many elements of the AI-defined network system can be treated as unique CIs with version control. For example, network topology or traffic patterns discovered from a live system can be a unique object stored in a database. CI objects can be updated over time to reflect state change transitions while maintaining a record of state prior to and/or after a change. CI state can be, by default, stored indefinitely unless configured otherwise via administrative retention policy.

Trained models represent additional CIs tested, validated against other models, and/or ultimately published to network control system 315 (FIG. 3). Inputs to the model can be tracked as time-series and made relatable to the model, including digital twin training environment profiles, traffic profiles, training scenarios, training parameters, and/or training objectives. Post-training activities, including quality assurance activities, also can be made related to the model. Model publication can be an output of training system 320 (FIG. 3). Continuous monitoring of model performance can provide quality assurance of published models from within network control system 315 (FIG. 3), which can report KPIs back to training system 320 (FIG. 3). The application of MLOps concepts to the AI-defined network solution can permit the published AI model to undergo a continuous evaluation and/or can allow incremental model improvement without complete retraining.

Network Control

Network control system 315 (FIG. 3) can enable the AI-defined network solution to realize the advantages of a trained AI model within a live production network. Network control system 315 (FIG. 3) can provide the mechanisms by which an AI agent can control a network's routing behavior without direct user interaction. Network control system 315 (FIG. 3) can be selectively implemented in a centralized, decentralized, distributed, or hybrid manner. Routing within the environment can be made based on flows defined by a source/destination address and message classification tuple. When a node makes a routing or forwarding decision, it can do so at the flow level, allowing different traffic types, such as email and voice, to be treated differently in path selection.

Turning ahead in the drawings, FIG. 13 illustrates block diagrams of network control system deployment models 1300, including a centralized network control system deployment model 1310, a decentralized network control system deployment model 1330, and a distributed network control system deployment model 1350. Network control system deployment models 1300 are merely exemplary, and embodiments of the network control system deployment models are not limited to the embodiments presented herein.

In several embodiments, centralized network control system deployment model 1310 can utilize a centralized SDN controller 1311 to facilitate routing decisions, which can include a central agent and a monitor. Each participating SDN node 1312 can maintain a management connection to the SDN controller. The management connection can allow the SDN controller to register nodes, program node configurations, provide routing instructions, monitor node state, and/or otherwise administer the network from a central authority. Inter-node routing decisions can be determined at the controller level via deterministic methods like SPF or AI agent inference.

In a number of embodiments, decentralized network control system deployment model 1330 can utilize a central SDN controller 1331 and local SDN controllers 1332-1334. Central SDN controller 1331 can include a central agent and a monitor. Local SDN controllers 1332-1334 can be used locally within each domain of SDN nodes, such as local SDN controller 1332 for nodes 1335, local SDN controller 1333 for nodes 1337, and local SDN controller 1334 for nodes 1336. Central SDN controller 1331 still behaves as a central authority. AI agent models can be published amongst participating controllers hierarchically. Specifically, hierarchically trained AI agents can be run throughout a network environment as federated agents for specific routing domains.

In several embodiments, distributed network control system deployment model 1350 can utilize a local agent at each of the SDN nodes (e.g., 1352). For example, a node 1353 of nodes 1352 can include a local agent 1354 that implements a trained AI model, and each of the other nodes 1352 can similarly include a respective local agent. The AI models deployed to the local agents (e.g., 1354) can still be built by training system 320 (FIG. 3), and can be published to participating network nodes. In distributed network control system deployment model 1350, SPF calculations also can be built by training system 320 (FIG. 3) and distributed to the nodes as a fallback mechanism. The deployed routing models can run as applications on the nodes to implement routing locally. A central agent is not used, but a central monitor 1351 can be used.

In many embodiments, observations can remain centralized to a monitor service in each deployment model, as a holistic view of the network can be used to make intelligent routing decisions even when distributed or decentralized. The monitor service itself can be hierarchical but ultimately permits replication of state observations among monitors. Distributed nodes can query the monitor service for observations to determine the optimal action, as can the decentralized SDN control process in a decentralized model.

Route Programming

In several embodiments, within each of network control system deployment models 1300, routing can prefer local lookups to external lookups. Upon receiving a datagram, the receiving node can first perform a local table lookup to determine if the destination address for that flow is available. If this lookup is successful, the node can forward without external assistance. If the local lookup is unsuccessful, the node can solicit the SDN control service for optimal route selection based on flow.

A staggered approach to route programming can be utilized to minimize latency for route lookups based on flows and/or to provide continuity. Route programming can be balanced against the capabilities of a node, specifically the memory and table space it has available to store routes locally. The AI-defined networking solution can allow for predictive, proactive, reactive, and/or hybrid flow programming approaches. The staggered route programming approach can be utilized within each of network control system deployment models 1300, which can prefer the predictive approach over proactive, and proactive over reactive.

In the reactive flow programming approach, each node can populate local flow table entries in an on-demand fashion. When a node will forward a datagram to a locally unknown destination, it can query the SDN control service for a flow entry. Since the local flow table is otherwise empty except after a request, the flow programming method is considered reactive. Reactive flow programming can be used on its own, or in a hybrid model with predictive and/or proactive programming as a fall back route programming mechanism if pre-programmed flow entries lack the flow data to process to the request. Reactive flow programming is extremely effective but incurs latency for the SDN lookup request. Lookup latency increases linearly for the number of the nodes in the routed path, as each node in the path performs its own SDN lookup.

Proactive flow programming can seek to reduce the total lookup latency incurred in a multi-node path by performing a single SDN lookup. The proactive flow programming approach can begin with a similar flow lookup request as a reactive model, but can differ in the node programming approach from the SDN control service. After receiving an initial lookup request, the SDN control service can determine the entire path of nodes for the flow. Instead of just programming the flow entry on the initial node that sent the request, proactive programming also can program flow entries for all subsequent nodes in the determined path. This allows a flow traversing multiple nodes in a path to experience the SDN lookup latency of a single request, as opposed to one request for each node. Proactive flow programming can therefore be advantageous over reactive programming when lookup latency is a concern, such as with networks that have a large number of nodes to traverse for a given flow. Proactively programmed entries can permit low latency local forwarding while also allowing for autonomous operations and continuity if the controller service becomes unreachable.

The predictive flow programming approach can seek to reduce SDN lookup requests altogether, while considering the availability of local flow table space as a constraint. Based on previous route lookups recorded by the routing agent and historical traffic data captured by the monitor service, a prediction can be made as to which flows are most relevant to a node for a given time period. Network control system 315 (FIG. 3) can then program the predicted flow entries before they are requested. The predictive model also can be built from training system 320 (FIG. 3) using synthetic traffic flow data on the digital twin. Predictive entries can be selected from all available candidate entries based on their modeled frequency and criticality of use for a given time of operation.

A basic example of the predictive flow model is shown below. This model seeks to maximize highest priority flow entries for predictive flow programming by considering the probability of flow frequency. The model assigns a penalty to each potential flow$_i$ entry based on the scaling parameter a, allowing an administrator to define a weight against flow relevance. Flows selection is constrained to fit within table size $n_{max\text{-}min}$. The process is repeated for each node$_j$ to be programmed within the network.

Find a set of flows that maximize $\sum_k (P(flow_i) - \text{Penalty}(flow_i))$, constrained by $n_{min} < \text{Count}(node_j) < n_{max}$ for all $j$ where $\text{Penalty}(flow_i) = 1 - \alpha \dfrac{t_{avg}(flow_{best})}{t_{avg}(flow_i)}$, where $P(flow_i)$ is the probability of $(flow_i)$ occurring, $n_{min}$ and $n_{max}$ are the respective minimum and maximum number of flow entries that can be programmed on a node, Count (node$_j$) is the total number of times a node appears in a set of flows, a is a free parameter to adjust penalty values, $t_{avg}(flow_{best})$ is the average time of the fastest flow between a set of endpoints, and $t_{ang}$ (f low$_i$) is the average time for (flow$_i$).

External Connectivity

In some embodiments, the AI capabilities of the AI-defined network solution can be focused within the solution's domain of control but do not prohibit external connectivity. Directly connected hosts can be tracked as edges to the known topology via network control system 315 (FIG. 3). Unknown hosts can be discovered via traditional adjacency mechanisms, including Cisco Discovery Protocol (CDP) and Link Layer Discovery Protocol (LLDP) querying mechanisms, discovery via monitoring and inspecting traffic flows, and control plane mechanisms including Address Resolution Protocol (ARP) and broadcasts. Network control system 315 (FIG. 3) also can perform targeted queries for unknown host resolution, such as sending requests on links that show active but do not have a known host entry yet.

Networks that are external to network control system 315 (FIG. 3) can be known through static or dynamic programming. In the dynamic scenario, a border node within network control system 315 (FIG. 3) can run a traditional routing protocol and establish neighborship with the external. Exchanging routing information with external peers can allow network control system 315 (FIG. 3) to advertise and receive external routes dynamically. The border node can publish external route information directly with the controller service, which can then shares that information with the training service. Training system 320 (FIG. 3) can treat the external networks as viable destinations for training purposes, with a reward accumulated for successful training traffic forwarding to the correct border node for the destination networks.

Customer Profiles

In several embodiments, data within the AI-defined network solution can be usable by the implementing organization and not shared externally by default. For example, one customer's configurations and state are not shared directly with other customers or the AI-defined network solution provider by default. If a customer elects to opt-in to solution improvement, their data can be collected by the AI-defined network vendor to improve solution offerings. Data can be collected with customer-specific information removed and/ or can be put through a "fuzzy" process similar to that used in traffic generation. Examples of data collected include network topology, traffic profiles, performance statistics, hyper-parameter settings, etc.

Captured data can be used by the AI-defined network solution provider to enhance and improve customer offerings. At the most basic level, captured data can be used for provider troubleshooting and support. Captured data also can be anonymously aggregated across customers to enhance product features, should the customers opt-in to this process. Aggregated data can be used to create new product features and offerings, including baseline hyper-parameter, modeling, training, or traffic profiles that can be used by AI-defined network customers.

User Interface

User interface system 310 (FIG. 3) can provide a user interface to allow for interaction with the AI-defined network solution, abstracting aspects of network control, such as the network's monitoring and/or management, for the user. User interface system 310 (FIG. 3) can act as a management layer on top of the underlying training system 320 (FIG. 3) and network control system 315 (FIG. 3). The user can manage every aspect of the solution through a series of pages and features. The AI-defined network solution can be able to observe the live network and address issues as they arise through the user interface. User interface system 310 (FIG. 3) can contain functionality to tune network performance, to protect against attacks and failures proactively, and to recover swiftly in the event of failure. User interface system 310 (FIG. 3) can allow administrators to maintain and publish different AI models to network control system 315 (FIG. 3).

Figure 14:
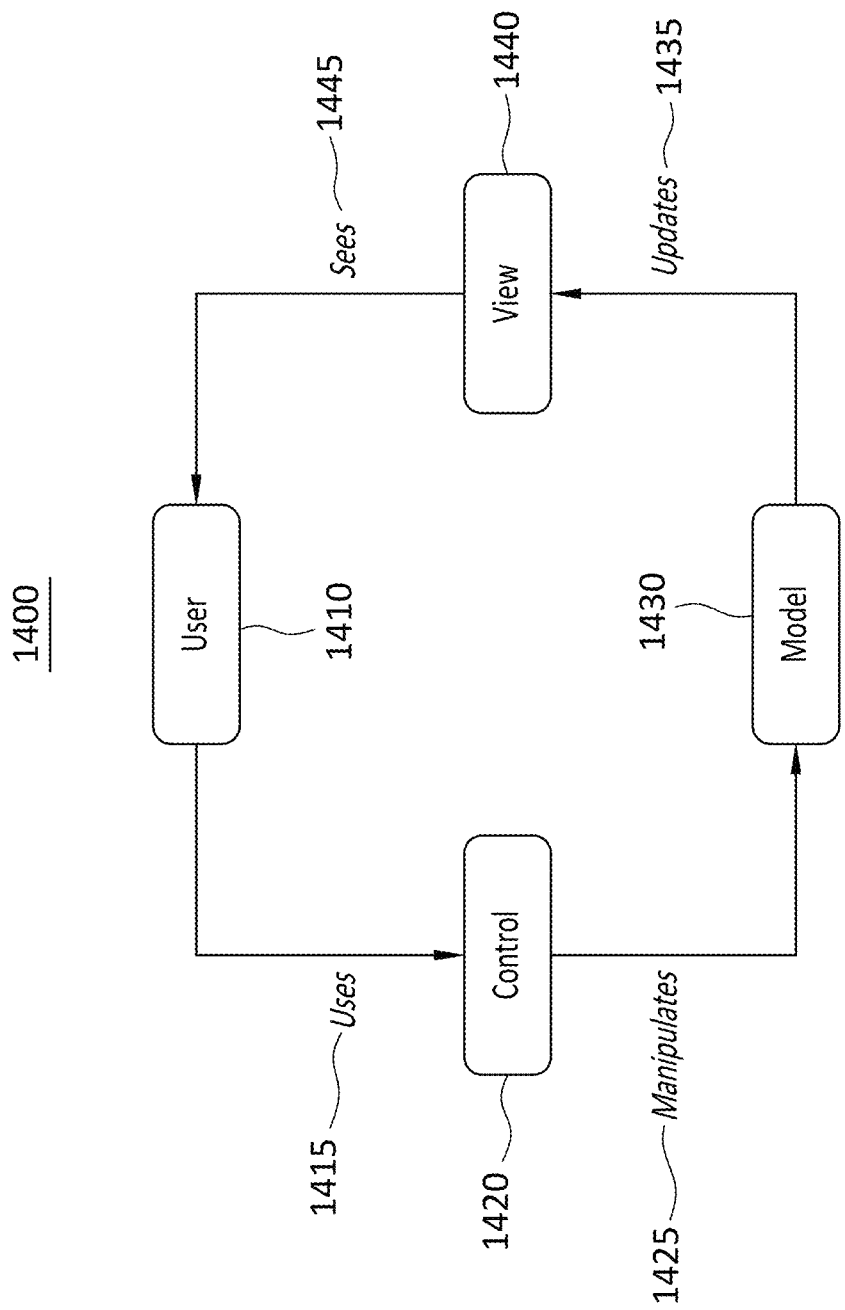
FIG. 14 illustrates block diagrams of a Model-View-Controller model, according to an embodiment.

Turning ahead in the drawings, FIG. 14 illustrates block diagrams of a Model-View-Controller (MVC) model 1400, according to an embodiment. MVC model 1400 is merely exemplary, and embodiments of the MVC model are not limited to the embodiments presented herein. The user interface provided by user interface system 310 (FIG. 3) can utilize MVC model 1400 as a software design pattern. MVC model 1400 can be distinct from the SDN controller service within network control system 315 (FIG. 3). A user 1410 can use 1415 controls 1420 to manipulate 1425 the underlying data model 1430. Updates 1435 to data model 1430 can be viewed 1440 by user 1410 who sees 1445 the state of data model 1430. User 1410 thus can affect the underlying data model by viewing and/or controlling training system 320 (FIG. 3) and/or network control system 315 (FIG. 3). MVC patterns can be applicable to each CI within the user interface, including the AI agent modeling.

Figure 15:
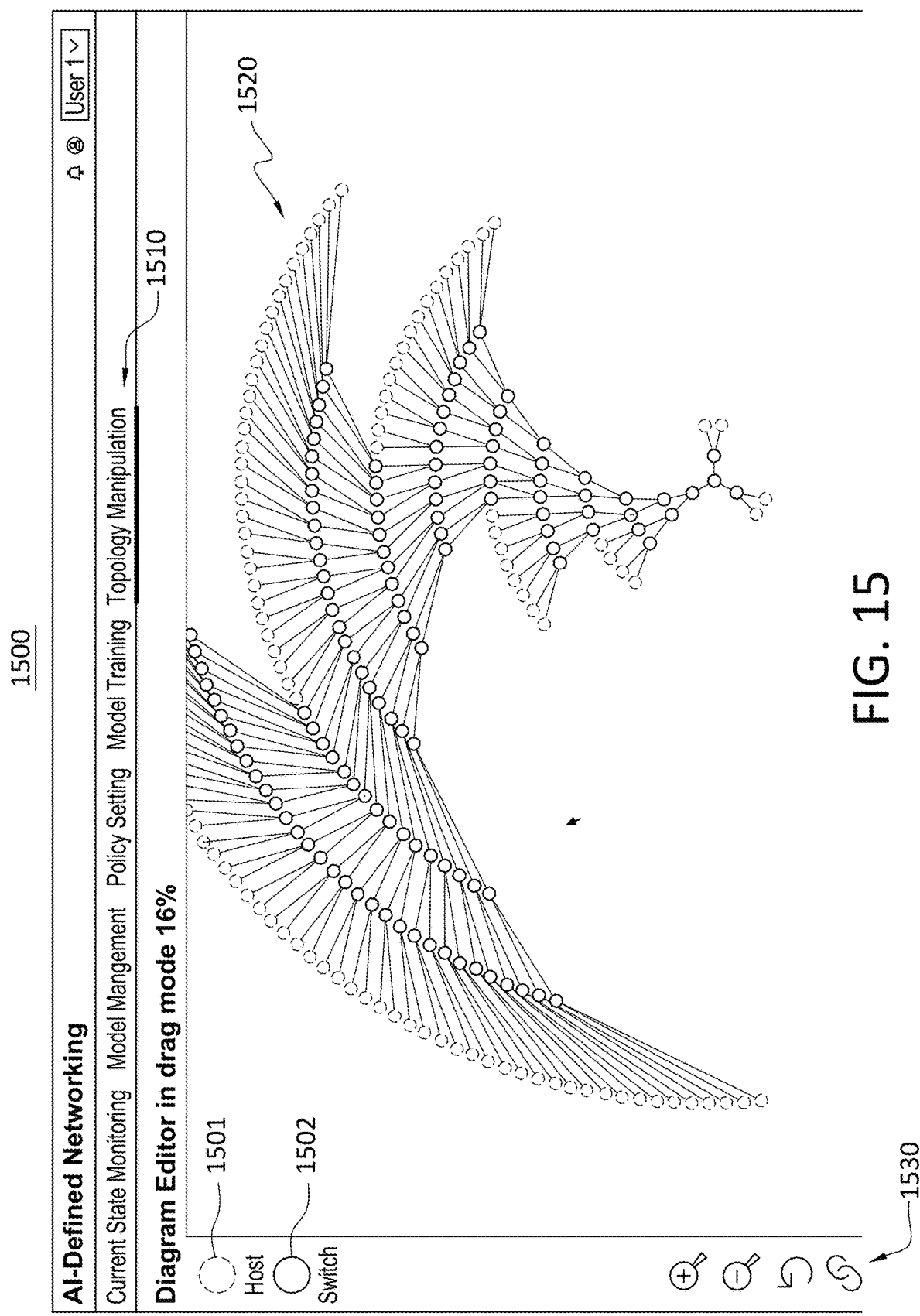
FIGS. 15 and 16 illustrate exemplary user interface displays showing a topology editor.
Figure 16:
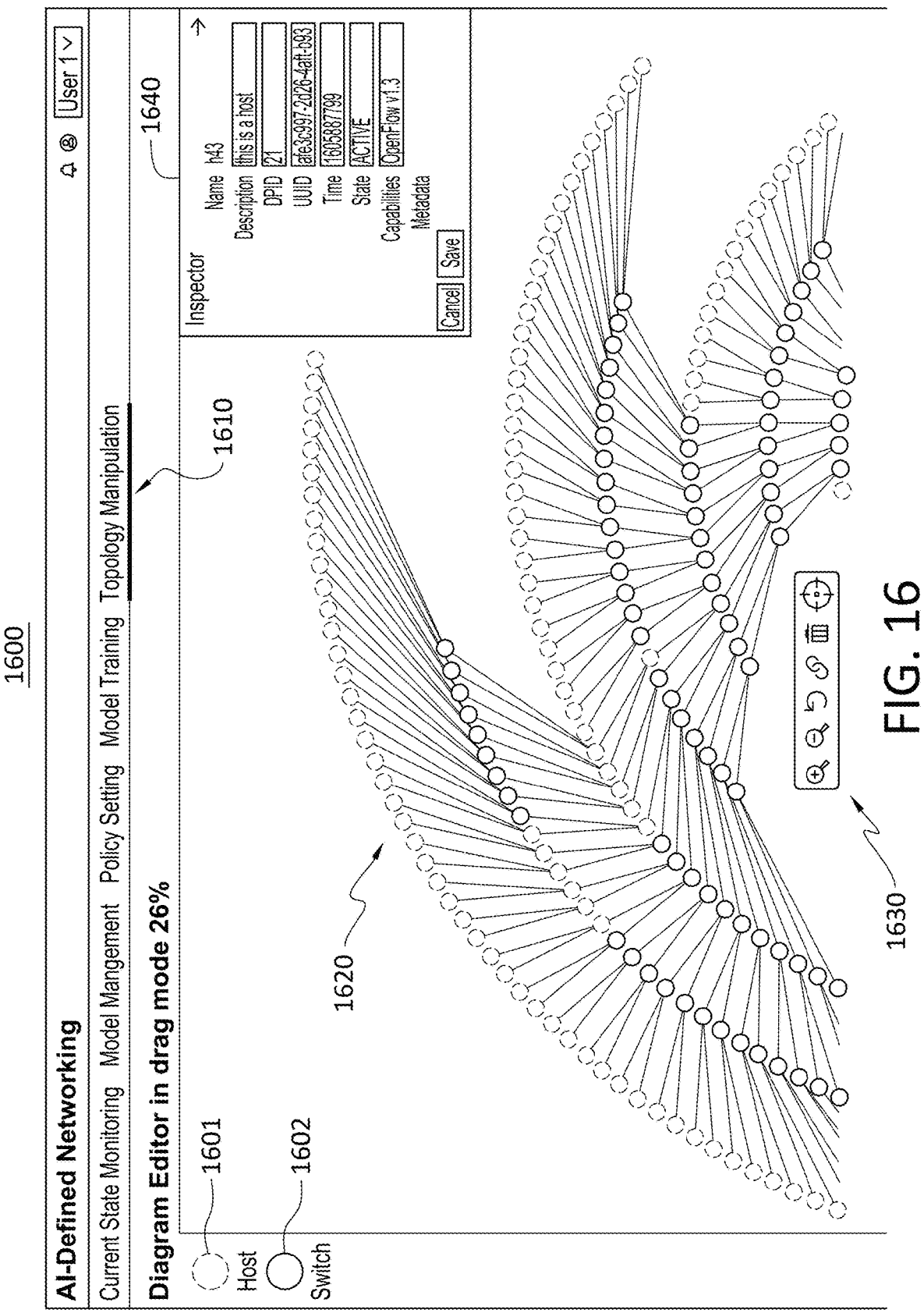

Turning ahead in the drawings, FIGS. 15 and 16 illustrates exemplary user interface displays 1500 and 1600 of a user interface showing a topology editor. User interface displays 1500 and 1600 can be displays of a user interface provided by user interface system 310 (FIG. 3). User interface displays 1500 and 1600 are merely exemplary, and embodiments of the user interface are not limited to the embodiments presented. User interface display 1500 can include a menu 1510, controls 1530, a topology display 1520, and/or an elements menu including a host 1501 and a switch 1502. User interface display 1600 similarly can include a menu 1610, controls 1630, a topology display 1620, and/or an elements menu including a host 1601 and a switch 1602, but user interface display 1600 can include an element details component 1640. Menu 1610 can be similar or identical to menu 1510, controls 1630 can be similar or identical to controls 1530, topology display 1520 can be similar or identical to topology display 1520, host 1601 can be similar or identical to host 1501, and/or switch 1602 can be similar or identical to switch 1502.

In a number of embodiments, the models the user interacts with through user interface system 310 (FIG. 3) can be based on network topology, per the defined centralized, decentralized, or distributed deployment model (e.g., 1300). A user can examine and modify the existing network topology, download an externally created topology, or create a new topology using the topology manipulation option in menu 1510 and/or 1610. These models are the digital twin models of the network. Network topologies can be editable through an interactive menu of network elements, such as a series of drag-and-drop icons, such as host 1501 and/or 1601, switch 1502 and/or 1601, and/or other network elements. The digital twin network topology can be traversable in topology display 1520 and/or 1620 similar to a digital map, allowing the user to zoom in or out and scroll to different focus areas.

The user can specify the metadata associated with each of these elements (i.e., capacity, IP address, or similar), such as through element details component 1640. The visual design of the topology can be customizable based on a user's preference. A user can, for example, change the color of a link to represent a certain link speed. Metadata can be manipulated by the user via graphical features such as pointer hovering over a specific element of the network or filtered lists. The topology manipulation page selected in menu 1510 and/or 1610 can allow the user to add or remove features from an existing imported network, which can be helpful for preparing an appropriate model in advance of a topology change. In a number of embodiments, each variation of a model can be saved separately to a database for comparison and/or re-use.

Figure 17:
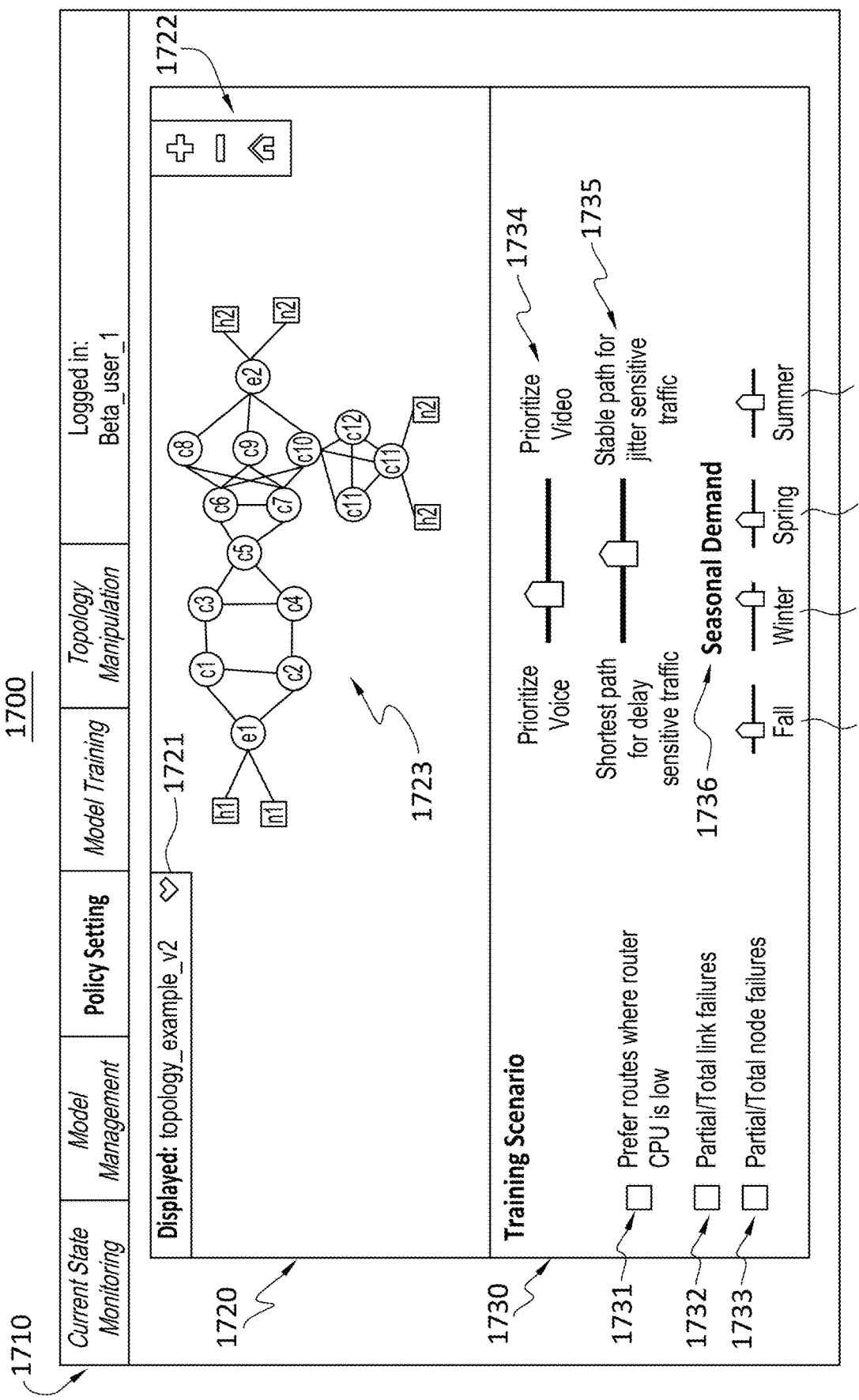
FIG. 17 illustrates an exemplary user interface display for defining a training scenario.

Once a given topology is set, the next step is to set a declarative policy training scenario for the network though user interface system 310 (FIG. 3). Turning ahead in the drawings, FIG. 17 illustrates an exemplary user interface display 1700 for defining a training scenario. User interface display 1700 can be a display of the user interface provided by user interface system 310 (FIG. 3). User interface display 1700 is merely exemplary, and embodiments of the user interface are not limited to the embodiments presented. User interface display 1700 can include a menu 1710, a topology component 1720, and/or a training scenario component 1730. Menu 1710 can be similar or identical to menu 1510 (FIG. 15) and/or menu 1610 (FIG. 15). In many embodiments, the user can select the policy setting option in menu 1710 to specify policy settings for a training scenario. Topology component 1720 can display a currently selected topology 1723, which can be adjusted using a topology selector 1721, and which can be viewed at different zoom levels using controls 1722.

In several embodiments, the user can specify the training scenario through interactive buttons, sliders, and editable text fields in training scenario component 1730. The user can customize policy tradeoffs and optimize data flow through the network, effectively tuning the RL model and its hyperparameters in accordance with the user's subject matter expertise and intent. Network speed and reliability, priority data type, and expected seasonal traffic variation are examples of the type of dimensions the user can create and modify. Several common training scenarios can be pre-loaded for users, with support for full customization. For example, as shown in training scenario component 1730, a user can select or de-select an option 1731 to prefer routes where the router CPU is low, select or de-select an option 1732 to include partial and/or total link failures, select or de-select an option 1733 to include partial and/or total node failures, use a slider 1734 to specify a setting between prioritizing voice and prioritizing video, use a slider 1735 to specify a setting between shortest path for delay sensitive traffic and stable path for jitter sensitive traffic, and/or use sliders 1736 to specify a level of seasonal demand, such as a slider 1737 for fall demand, a slider 1738 for winter demand, a slider 1739 for spring demand, and/or a slider 1740 for summer demand.

In many embodiments, once a topology has associated policy settings, training of the neural network in the underlying RL model can be performed with synthetic network traffic data, and the user can be able to select the desired traffic and/or application profiles. Traffic and/or application profiles can define the synthesized traffic used in training, as described above. The user can select the type of traffic to use in training the model, as well as other specifics, such as traffic sources and/or destinations. The traffic profile can be granular enough to specify when a particular event will occur during the training process, such as a malicious attack occurring after a certain length of time or a sudden increase in traffic volume.

In several embodiments, once a topology has both associated policy settings and a training profile, it can be ready for training. The user can select different algorithms for training based on the desired outcome, or even train the same topology and policies against multiple training scenarios to compare performance. Training can occur in training system 320 (FIG. 3) and can be initiated on-demand or scheduled. A suitable combination of training, intent-based policies, and topology can provide the RL model with sufficient experience with normal network performance but also prepared the RL model against failure scenarios or bad-actor attacks. The user can have control over the Configuration Items (e.g., policy settings, training profile, and/or RL algorithm), which can alter the reward matrix for the RL model.

Figure 18:
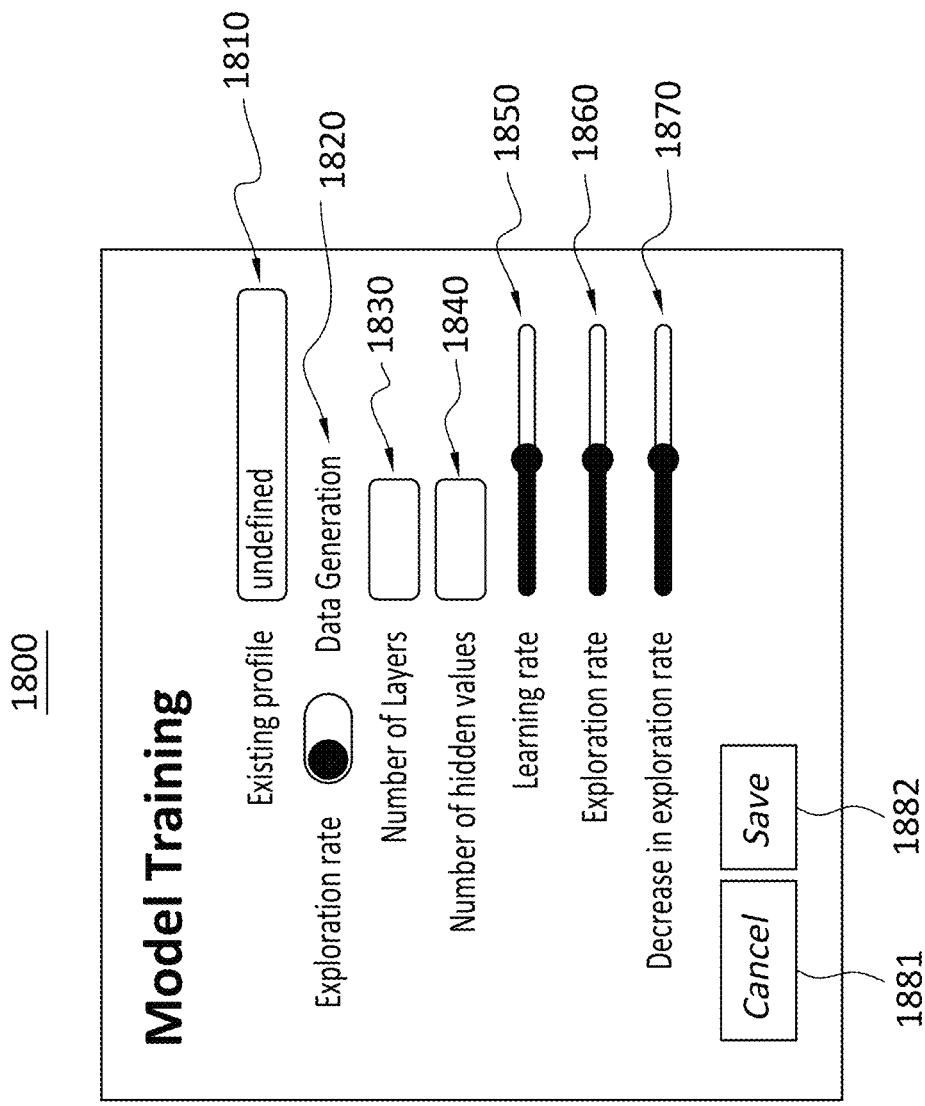
FIG. 18 illustrates an exemplary user interface display for defining training scenario settings.

Turning ahead in the drawings, FIG. 18 illustrates an exemplary user interface display 1800 for defining training scenario settings. User interface display 1800 is merely exemplary, and embodiments of the user interface are not limited to the embodiments presented. User interface display 1800 can be a display of the user interface provided by user interface system 310 (FIG. 3). User interface display 1800 can options to specify parameters and/or settings for training the AI agent model. For example, user interface display 1800 can include a profile field 1810, a selector 1820 to select exploration rate or data generation, a layer field 1830 to specify the number of layers in the model, a hidden values field 1840 to specify a number of hidden values in the model, a slider 1850 to specify a learning rate of the model, a slider 1860 to specify an exploration rate of the model, a slider 1870 to specify a decrease in exploration rate of the model, a cancel button 1881 to close without saving, and/or a save button 1882 to save selections.

In many embodiments, the user is able to train, deploy, and/or rollback different AI models, including the RL routing agent models and proactive flow programming models, through the user interface provided by user interface system 310 (FIG. 3). The user interface can include a menu of all models built over time with their associated CI data, training histories, and current state. A model's training history can be viewable as metadata associated with the model, and logs from training runs can be recorded so that the user can review any period of particular interest prior to or after deployment. A model can be set as the primary, with additional models set as alternates. Alternate models can allow the system to quickly rollback in the event of model failure, while also maintaining different models to be quickly applied during operational scenarios (e.g., normal operations versus peak demand periods).

Figure 19:
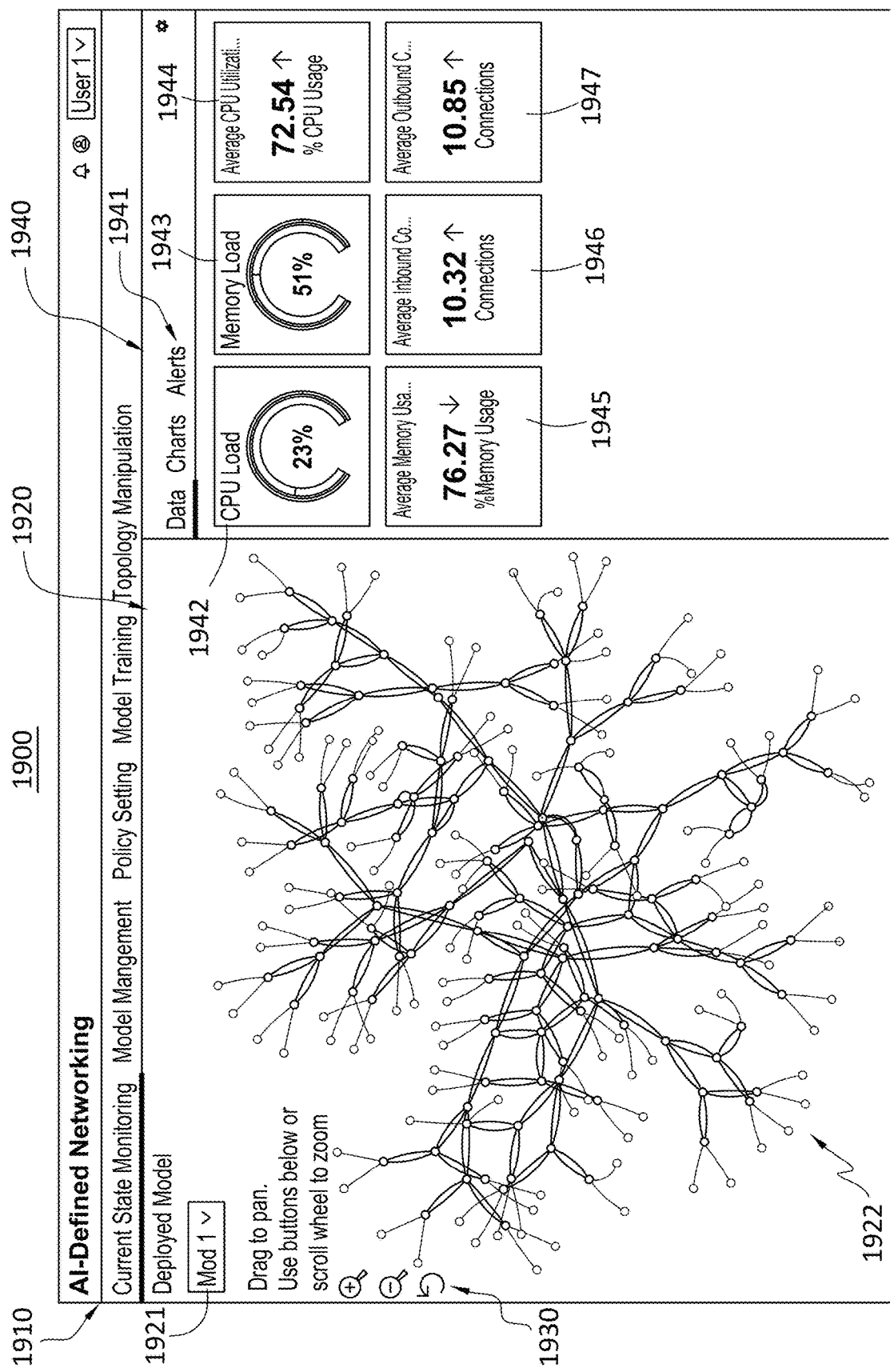
FIG. 19 illustrates an exemplary user interface display showing a network monitoring dashboard.

Turning ahead in the drawings, FIG. 19 illustrates an exemplary user interface display 1900 showing a network monitoring dashboard. User interface display 1900 is merely exemplary, and embodiments of the user interface are not limited to the embodiments presented. User interface display 1900 can be a display of the user interface provided by user interface system 310 (FIG. 3). User interface display 1900 can include a menu 1710, a topology display 1920, controls 1930, and/or a dashboard 1940. Menu 1910 can be similar or identical to menu 1510 (FIG. 15), menu 1610 (FIG. 16), and/or menu 1710 (FIG. 17); topology display 1920 can be similar topology display 1520 (FIG. 15), topology display 1620 (FIG. 16), and/or topology component 1720 (FIG. 17); and/or controls 1930 can be similar or identical to controls 1530 (FIG. 15), controls 1630 (FIG. 16), and/or controls 1722 (FIG. 17). Topology display 1920 can include an identifier 1921 of the currently deployed topology and/or a display 1922 of the current topology 1922.

In many embodiments, the user can select the current state monitoring option in menu 1910 to monitor the state and/or performance of an AI model once it is deployed on the live network. When the model is deployed, the user can have visibility into the live network through an interactive dashboard, such as dashboard 1940, which can assist in tracking performance against relevant benchmarks, as well as alerting the user to any performance issues or security threats. The dashboard can include metrics and/or visualizations describing the network's health. In some embodiments, a dashboard menu 1941 can allow the user to select various different dashboard display options, such as data, charts, and/or alerts. For example, when the data option is selected in dashboard menu 1941, data components 1942-1947 can display metrics and/or visualizations for various performance metrics. KPIs can include node hardware status, packet loss, counters, errors, latency, and/or utilization. KPIs can be viewable at different levels, including per device, domain, or entire network. An alert and notify feature can exist within the user interface to highlight any important KPI changes to a user.

In addition to providing the user with control of the full lifecycle of model creation to deployment, the user interface can include the option for additional administrative configuration. Examples of administrative configuration can include Role-Based Access Control (RBAC) and/or power user options such as certificate configuration, server management, log downloading, and system shutdown.

Exemplary Flowcharts

Figure 20:
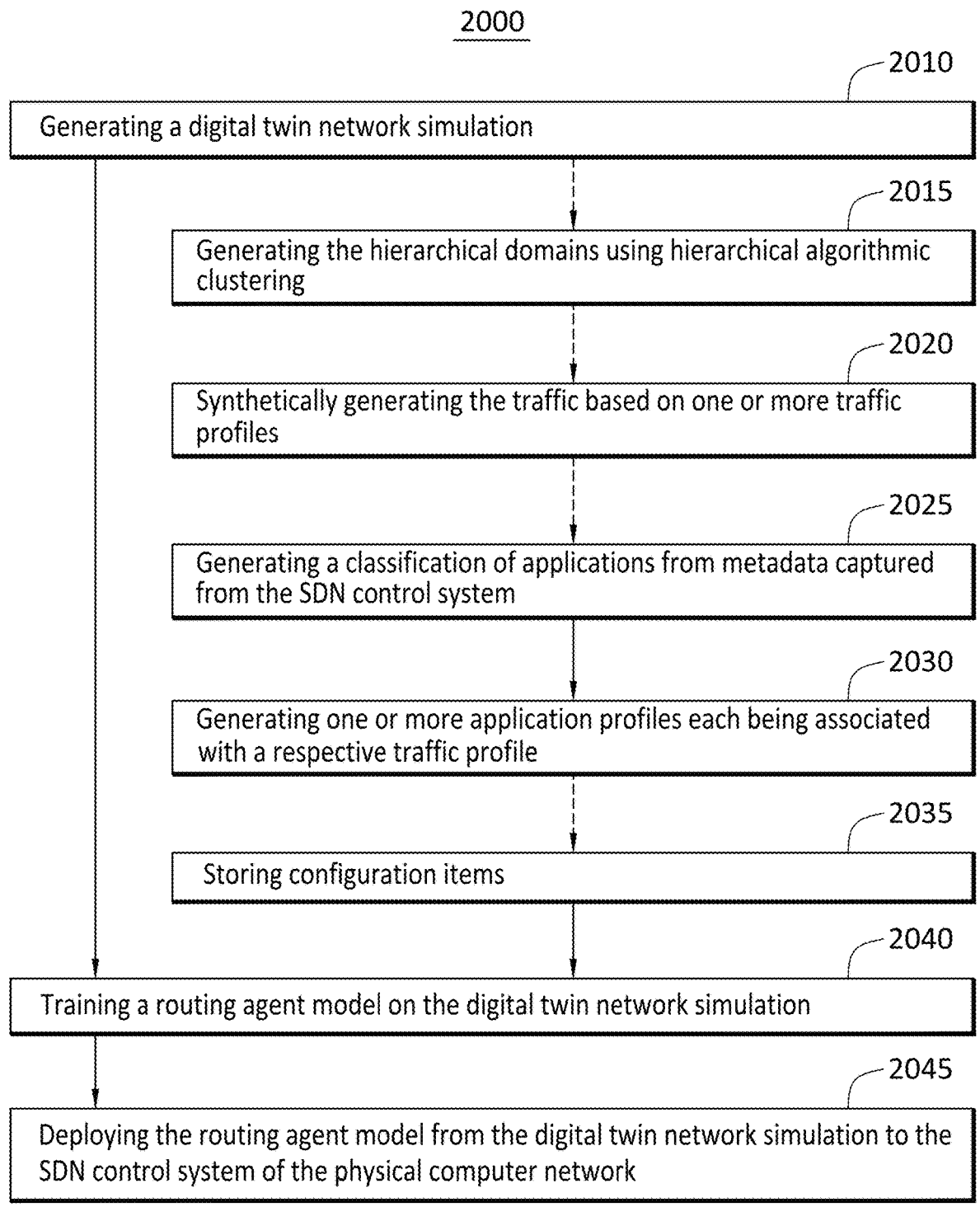
FIG. 20 illustrates a flow chart for a method of training a digital twin in AI-define networking, according to another embodiment.

Turning ahead in the drawings, FIG. 20 illustrates a flow chart for a method 2000 of training a digital twin in AI-define networking, according to another embodiment. Method 2000 is merely exemplary and is not limited to the embodiments presented herein. Method 2000 can be employed in many different embodiments or examples not specifically depicted or described herein. In some embodiments, the procedures, the processes, and/or the activities of method 2000 can be performed in the order presented. In other embodiments, the procedures, the processes, and/or the activities of method 2000 can be performed in any suitable order. In still other embodiments, one or more of the procedures, the processes, and/or the activities of method 2000 can be combined or skipped.

In many embodiments, system 300 (FIG. 3), training system 320 (FIG. 3), user interface system 310 (FIG. 3), and/or network control system 315 (FIG. 3) can be suitable to perform method 2000 and/or one or more of the activities of method 2000. In these or other embodiments, one or more of the activities of method 2000 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

Referring to FIG. 20, method 2000 can include an activity 2010 of generating a digital twin network simulation of a physical computer network controlled through a software-defined-network (SDN) control system. The digital twin network simulation can be similar or identical to digital twin 622 (FIG. 6), digital twin 822 (FIG. 6), and/or digital twin 1122 (FIG. 11). The physical computer network can be similar or identical to computer network nodes 330 (FIG. 3), live network 601 (FIG. 6), and/or computer network nodes 630 (FIG. 6). The SDN control system can be similar or identical to network control system 315 (FIG. 3), network control system 615 (FIG. 6), and/or network control system 815 (FIG. 8). The digital twin network simulation can be generated manually using user interface system 310 (FIG. 3) and/or automatically, as described above.

In a number of embodiments, the digital twin network simulation can be used to train a routing agent model, as shown in activity 2040, described below. In a number of embodiments, the routing agent model can be similar or identical to the AI agent model described above. In some embodiments, the routing agent model can include a plurality of hierarchical routing agents each controlling a respective hierarchical domain of a plurality of hierarchical domains, as shown in FIGS. 5 and 13, and described above. In several embodiments, the reinforcement-learning model can include a hierarchical reinforcement learning model, as shown in FIGS. 5 and 9, and described above. In several embodiments, multiple alternative versions of the routing agent model can be trained on traffic generated from different traffic profiles.

In several embodiments, method 2000 additionally and optionally can include an activity 2015 of generating the hierarchical domains using hierarchical algorithmic clustering based on strength and proximity metrics of relationships among the nodes of the digital twin network simulation, as shown in FIGS. 5 and 9, and described above.

In a number of embodiments, method 2000 further and optionally can include an activity 2020 of synthetically generating the traffic based on one or more traffic profiles. The traffic profiles can be similar or identical to traffic profile 841 (FIG. 8) and/or traffic profile 1138 (FIG. 11). In a number of embodiments, at least one of the one or more traffic profiles can include a fuzzy traffic profile.

In several embodiments, method 2000 additionally and optionally can include an activity 2025 of generating a classification of applications from metadata captured from the SDN control system. For example, the classification of applications can be similar or identical as shown in FIG. 10 and described above.

In a number of embodiments, method 2000 further can include, after block 2025, an activity 2030 of generating, based on the classification, one or more application profiles each being associated with a respective traffic profile. For example, the application profiles can be similar or identical to the application profile created in activity 1055 (FIG. 10) and/or application profile 1134 (FIG. 11), which can be associated with a traffic profile, such as traffic profile 1138 (FIG. 11).

In several embodiments, method 2000 additionally and optionally can include an activity 2035 of storing respective versions of the routing agent model, respective versions of network topologies of the physical computer network, and respective versions of traffic patterns captured from the physical computer network as respective configuration items with version control. The configuration items can be similar or identical to the configuration items described above in connection with FIGS. 12 and 17.

In a number of embodiments, method 2000 further can include an activity 2040 of training the routing agent model on the digital twin network simulation using the reinforcement-learning model on traffic that flows through nodes of the digital twin network simulation. The routing agent model can be similar or identical to AI agent routing service 316 (FIG. 3), agent 430 (FIGS. 4 and 7), agent 530 (FIG. 5), agent model 1251 (FIG. 12), and AI agent 1264 (FIG. 12). The reinforcement learning model can be similar or identical to RL model 400 (FIG. 4), HRL model 500 (FIG. 5), Meta-RL model 700 (FIG. 7), and/or RL model 1241 (FIG. 12). In some embodiments, the routing agent model can include a machine-learning model, such as a neural network, a random forest model, a gradient boosted model, and/or another suitable model. In a number of embodiments, the reinforcement-learning model can include a deep-Q meta-reinforcement learning model.

In some embodiments, activity 2040 of training the routing agent model on the digital twin network simulation using the reinforcement-learning model on traffic that flows through nodes of the digital twin network simulation further can include applying a policy-based reward function in the reinforcement-learning model to train the routing agent model to achieve one or more of: (1) limiting security attacks in the physical computer network; (2) accommodating changes in the physical computer network; (3) accommodating failures in the physical computer network; (4) prioritizing one or more types of traffic routed through the physical computer network; (5) prioritizing one or more types of applications communicating through the physical computer network; (6) optimizing device capacity in the physical computer network; (7) optimizing system capacity in the physical computer network; (8) optimizing flow of traffic through the physical computer network; and/or (9) accounting for variations in demand and consumption in the physical computer network.

In some embodiments, the digital twin network simulation can be rendered in different portions at different episodic steps of training the routing agent model, such as shown in FIG. 9 and described above. In a number of embodiments, the connection speeds of the digital twin network simulation can be set at a configurable scaled-down ratio of connection speeds of the physical computer network, such as using the reduction technique described above.

In several embodiments, method 2000 additionally can include an activity 2045 of deploying the routing agent model, as trained, from the digital twin network simulation to the SDN control system of the physical computer network. For example, the routing agent model trained in training system 320 (FIG. 3) can be deployed in network control system 315 (FIG. 3) to provide routing for computer network nodes 330 (FIG. 3).

Figure 21:
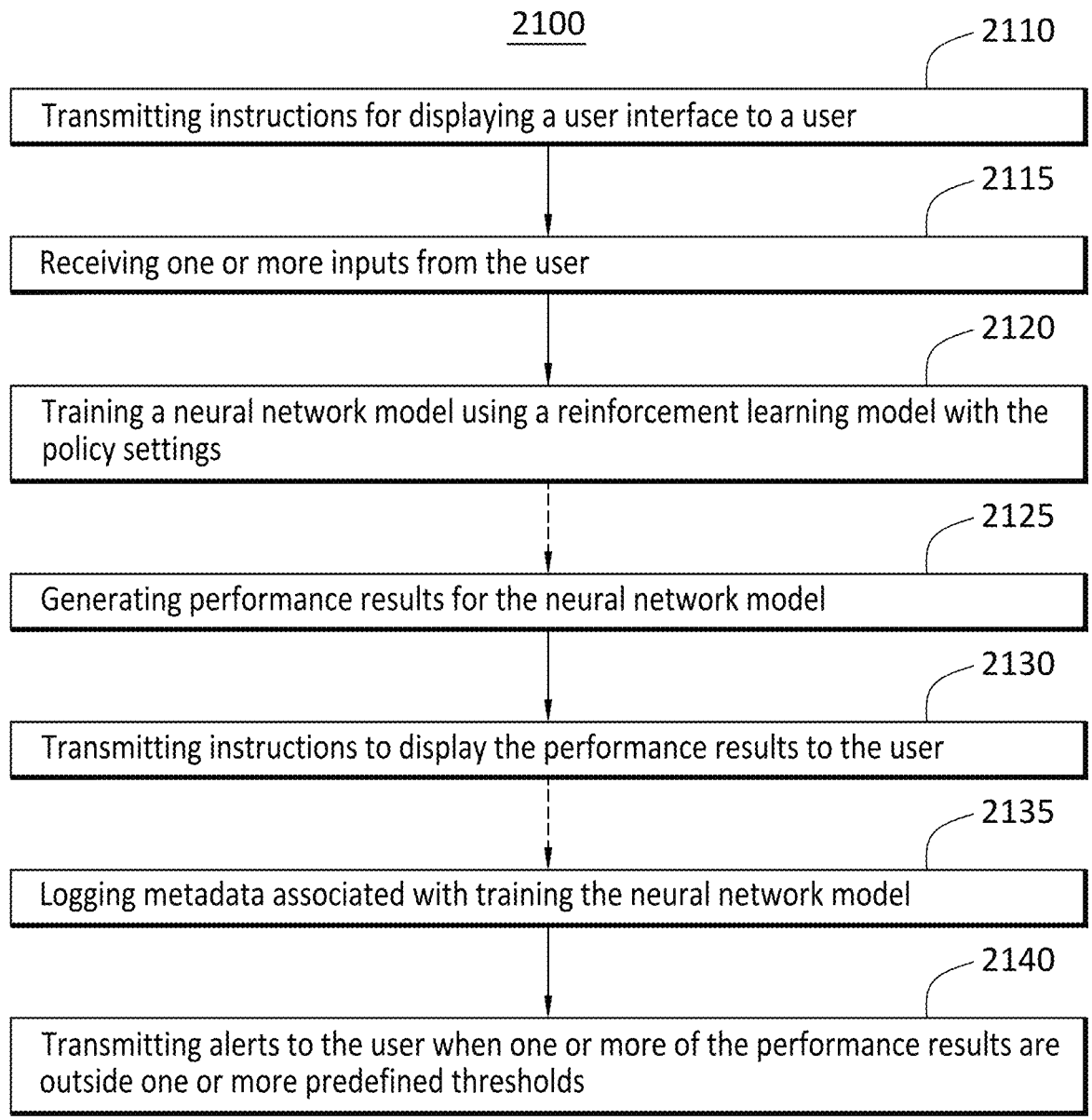
FIG. 21 illustrates a flow chart for a method of providing reinforcement-learning modeling interfaces, according to another embodiment.

Turning ahead in the drawings, FIG. 21 illustrates a flow chart for a method 2100 of providing reinforcement-learning modeling interfaces, according to another embodiment. Method 2100 is merely exemplary and is not limited to the embodiments presented herein. Method 2100 can be employed in many different embodiments or examples not specifically depicted or described herein. In some embodiments, the procedures, the processes, and/or the activities of method 2100 can be performed in the order presented. In other embodiments, the procedures, the processes, and/or the activities of method 2100 can be performed in any suitable order. In still other embodiments, one or more of the procedures, the processes, and/or the activities of method 2100 can be combined or skipped.

In many embodiments, system 300 (FIG. 3), user interface system 310 (FIG. 3), training system 320 (FIG. 3), and/or network control system 315 (FIG. 3) can be suitable to perform method 2100 and/or one or more of the activities of method 2100. In these or other embodiments, one or more of the activities of method 2100 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

Referring to FIG. 21, method 2100 can include an activity 2110 of transmitting a user interface to be displayed to a user. The user interface can be provided by GUI service 311 of user interface system 310 (FIG. 3), and exemplary displayed of the user interface can be similar or identical to user interface displays 1500 (FIG. 15), 1600 (FIG. 16), 1700 (FIG. 17), 1800 (FIG. 18), and/or 1900 (FIG. 19). In some embodiments, the user interface can include one or more first interactive elements that display policy settings of a reinforcement learning model. For example, the policy settings can be similar or identical to policies 1220 (FIG. 12), and/or the first interactive elements can be similar or identical to one or more of the elements of training scenarios component 1730 (FIG. 17) and/or one or more of the elements of user interface display 1800 (FIG. 18). The reinforcement learning model can be similar or identical to RL model 400 (FIG. 4), HRL model 500 (FIG. 5), Meta-RL model 700 (FIG. 7), and/or RL model 1241 (FIG. 12). In a number of embodiments, the one or more first interactive elements can be configured to allow the user to update the policy settings of the reinforcement learning model.

In some embodiments, the policy settings can include declarative routing policy settings. In a number of embodiments, the declarative routing policy settings can include one or more of a network reliability setting, a network speed setting, a priority data type setting, and/or a seasonal traffic setting.

In several embodiments, method 2100 also can include an activity 2115 of receiving one or more inputs from the user. In some embodiments, the inputs can include one or more modifications of at least a portion of the one or more first interactive elements of the user interface to update the policy settings of the reinforcement learning model.

In a number of embodiments, method 2100 additionally can include an activity 2120 of training a neural network model using a reinforcement learning model with the policy settings as updated by the user to adjust rewards assigned in the reinforcement learning model. The neural network model can be similar or identical to neural network model 431 (FIG. 4) and/or neural network models 531 (FIG. 5). In many embodiments, the neural network model can include a routing agent model configured to control a physical computer network through a software-defined-network (SDN) control system. In other embodiments, the neural network model can be used for another suitable application.

In some embodiments, the user interface further can include second interactive elements configured to define a network topology. The second interactive elements can be similar or identical to topology display 1520 (FIG. 15), topology display 1620 (FIG. 16), topology component 1720 (FIG. 17), and/or topology display 1920. In several embodiments, the one or more inputs from the user further can include definitions of the network topology. In a number of embodiments, the definitions of the network topology can include one or more of discovering and importing an existing network topology, creating a new network topology, or modifying an existing network topology. In many embodiments, the routing agent model can be trained using the reinforcement learning model based on traffic that flows through nodes of the network topology.

In several embodiments, the user interface further can include third interactive elements configured to select one or more traffic profiles used to train the routing agent model. The traffic profiles can be similar or identical to traffic profile 841 (FIG. 8) and/or traffic profile 1138 (FIG. 11). In some embodiments, the one or more inputs from the user further can include one or more selections of the one or more traffic profiles. In a number of embodiments, the routing agent model can be trained using the one or more traffic profiles.

In various embodiments, the user interface further can include fourth interactive elements configured to select one or more application profiles associated with one or more traffic profiles used to train the routing agent model. The application profiles can be similar or identical to the application profile created in activity 1055 (FIG. 10) and/or application profile 1134 (FIG. 11). In some embodiments, the one or more inputs from the user further can include one or more selections of the one or more application profiles. In several embodiments, the routing agent model can be trained using the one or more traffic profiles associated with the one or more application profiles.

In a number of embodiments, the user interface further can include fifth interactive elements configured to define respective configuration settings for each respective routing agent model of one or more routing agent models. The fifth interactive elements can be similar or identical to one or more of the elements of user interface display 1800 (FIG. 18). The one or more routing agent models can include the routing agent model. In some embodiments, the one or more inputs from the user further can include one or more definitions of the respective configuration settings comprising one or more of respective publication settings for the respective routing agent model, one or more of update intervals for the respective routing agent model, one or more target networks for the respective routing agent model, and/or or implementation settings for the respective routing agent model. In many embodiments, the respective routing agent model can be adjusted based on the configuration settings. In several embodiments, the configuration settings of the routing agent model can include at least one of a number of training epochs or a number of layers of the routing agent model. In some embodiments, the user interface further can include a menu of routing agent models that have been trained using the reinforcement learning model and are operable to control the physical computer network through the SDN control system. In a number of embodiments, the user interface further can display a comparison between the routing agent models before one or more of the routing agent models are selected for deployment on the SDN control system.

In several embodiments, method 2100 further and optionally can include an activity 2125 of generating performance results for the neural network model as trained using the policy settings as updated by the user. For example, the performance results can be similar or identical to the performance metrics described in connection with dashboard 1940 (FIG. 19).

In a number of embodiments, method 2100 additionally can include, after block 2125, an activity 2130 of transmitting the performance results to be displayed to the user. For example, the performance results can be displayed as shown in dashboard 1940 (FIG. 19).

In several embodiments, method 2100 further and optionally can include an activity 2135 of logging metadata associated with training the neural network model. In a number of embodiments, the performance results can be measured using benchmarks comprising at least one of node hardware status, packet loss, counters, errors, latency, or utilization.

In a number of embodiments, method 2100 additionally can include, after block 2135, an activity 2140 of transmitting alerts to be displayed to the user when one or more of the performance results are outside one or more predefined thresholds.

Figure 22:
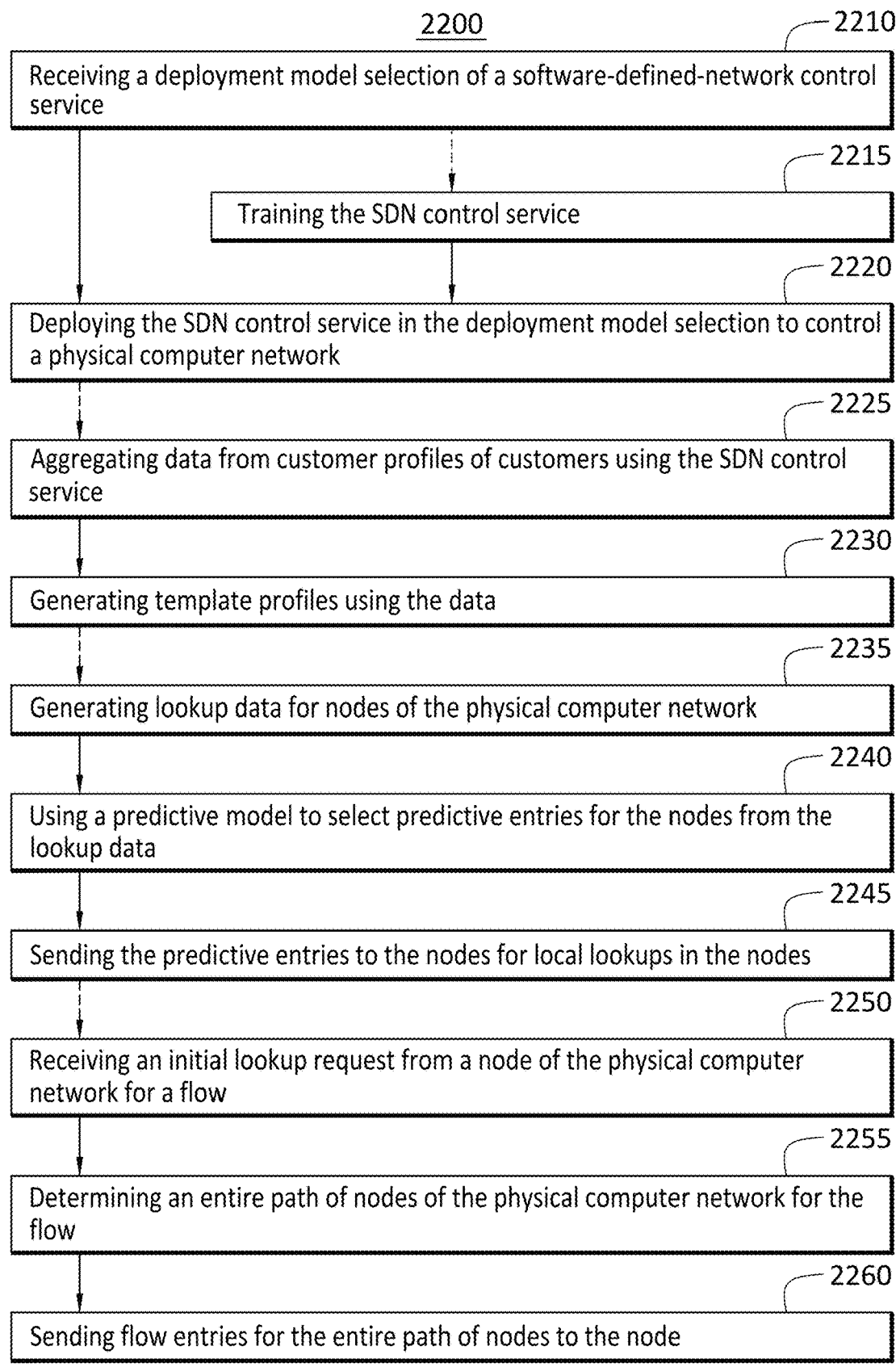
FIG. 22 illustrates a flow chart for a method of providing network control in AI-defined networking, according to another embodiment.

Turning ahead in the drawings, FIG. 22 illustrates a flow chart for a method 2200 of providing network control in AI-defined networking, according to another embodiment. Method 2200 is merely exemplary and is not limited to the embodiments presented herein. Method 2200 can be employed in many different embodiments or examples not specifically depicted or described herein. In some embodiments, the procedures, the processes, and/or the activities of method 2200 can be performed in the order presented. In other embodiments, the procedures, the processes, and/or the activities of method 2200 can be performed in any suitable order. In still other embodiments, one or more of the procedures, the processes, and/or the activities of method 2200 can be combined or skipped.

In many embodiments, system 300 (FIG. 3), network control system 315 (FIG. 3), user interface system 310 (FIG. 3), and/or training system 320 (FIG. 3) can be suitable to perform method 2200 and/or one or more of the activities of method 2200. In these or other embodiments, one or more of the activities of method 2200 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

Referring to FIG. 22, method 2200 can include an activity 2210 of receiving a deployment model selection of a software-defined-network (SDN) control service. The SDN control service can be similar or identical to control service 317 (FIG. 3), controller 617 (FIG. 6), centralized SDN controller 1311 (FIG. 13), central SDN controller 1331 (FIG. 13), local SDN controllers 1332-1334 (FIG. 13), and/or local agent 1354 (FIG. 13). In some embodiments, the deployment model selection can be one of a centralized model, a decentralized model, a distributed model, or a hybrid model.

The centralized model can be similar or identical to centralized network control system deployment model 1310 (FIG. 13). In many embodiments, the SDN control service in the centralized model can include a central monitor service, a central SDN agent on a central SDN controller, and a respective management connection to each node of the physical computer network. The central SDN controller can be similar or identical to centralized SDN controller 1311 (FIG. 13).

The decentralized model can be similar or identical to decentralized network control system deployment model 1330 (FIG. 13). In many embodiments, the SDN control service in the decentralized model can include a central monitor service, a central SDN agent on a central SDN controller, and a respective SDN child agent associated with each respective hierarchical domain of the physical computer network. The central SDN controller can be similar or identical to central SDN controller 1331 (FIG. 13). The SDN child agent can be similar or identical to local SDN controllers 1332-1334 (FIG. 13). In a number of embodiments, the respective SDN child agent can include a respective management connection to each node in the respective hierarchical domain.

The distributed model can be similar or identical to distributed network control system deployment model 1350 (FIG. 13). In several embodiments, the SDN control service in the distributed model can include a central monitor service and a respective local SDN agent associated with each node in the physical computer network. The central monitor service can be similar or identical to central monitor 1351. The local SDN agent can be similar or identical to local agent 1354 (FIG. 13). In some embodiments, the SDN control service in the hybrid model can include elements of two or more of the centralized model, the decentralized model, or the distributed model.

In several embodiments, method 2200 additionally and optionally can include an activity 2215 of training the SDN control service. In some embodiments, activity 2215 can include training the respective SDN child agents of the SDN control service in the decentralized model using a hierarchical reinforcement learning model. The hierarchical reinforcement learning model can be similar or identical to HRL model 500 (FIG. 5). In some embodiments, activity 2215 can include training each of the respective local SDN agents of the SDN control service locally in the distributed model using the reinforcement learning model.

In a number of embodiments, method 2200 additionally can include an activity 2220 of deploying the SDN control service in the deployment model selection to control a physical computer network. The physical computer network can be similar or identical to computer network nodes 330 (FIG. 3), live network 601 (FIG. 6), and/or computer network nodes 630 (FIG. 6). In some embodiments, the physical computer network can be connected to an external network that is not controlled by the SDN control service, and the SDN control service can be configured to receive routing information from the external network.

In many embodiments, the SDN control service can use a routing agent model trained using a reinforcement-learning model. The routing agent model can be similar or identical to AI agent routing service 316 (FIG. 3), agent 430 (FIGS. 4 and 7), agent 530 (FIG. 5), agent model 1251 (FIG. 12), and AI agent 1264 (FIG. 12). In several embodiments, routing within the SDN control service is performed based on flows defined by a source address, a destination address, and a datagram classification tuple. In a number of embodiments, the routing agent model can be trained using the reinforcement-learning model with one or more traffic profiles or one or more application profiles to segment traffic in the physical computer network using a policy of the reinforcement-learning model having a negative reward above a predetermined threshold upon at least one of: communication between predetermined endpoints or communication through a predetermined path, such as using the segmentation techniques described above.

In several embodiments, method 2200 further and optionally can include an activity 2225 of aggregating data from customer profiles of customers using the SDN control service.

In a number of embodiments, method 2200 additionally can include, after block 2225, an activity 2230 of generating template profiles using the data from the customer profiles.

In several embodiments, method 2200 further and optionally can include an activity 2235 of generating, in the SDN control service, lookup data for nodes of the physical computer network indexed by destination addresses of flows through the nodes, based on routing decisions provided by the routing agent model.

In a number of embodiments, method 2200 additionally can include, after block 2235, an activity 2240 of using a predictive model to select predictive entries for the nodes from the lookup data based at least in part on frequencies of the flows.

In several embodiments, method 2200 further can include, after block 2240, an activity 2245 of sending the predictive entries to the nodes for local lookups in the nodes.

In a number of embodiments, method 2200 additionally and optionally can include, an activity 2250 of receiving, at the SDN control service, an initial lookup request from a node of the physical computer network for a flow.

In several embodiments, method 2200 further can include, after block 2250, an activity 2255 of determining an entire path of nodes of the physical computer network for the flow.

In a number of embodiments, method 2200 additionally can include, after block 2255, an activity 2260 of sending flow entries for the entire path of nodes to the node.

CONCLUSION

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although AI-defined networking, training a digital twin in AI-defined networking, reinforcement-learning modeling interfaces, and network control in AI-defined networking have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-22 may be modified, and that the foregoing discussion of certain of these embodiments does not necessarily represent a complete description of all possible embodiments. For example, one or more of the procedures, processes, or activities of FIGS. 8-12, 14, and 20-22 may include different procedures, processes, and/or activities and be performed by many different modules, in many different orders, and/or one or more of the procedures, processes, or activities of FIGS. 8-12, 14, and 20-22 may include one or more of the procedures, processes, or activities of another different one of FIGS. 8-12, 14, and 20-22. As another example, the systems within system 300 (FIG. 3) and/or system 600 (FIG. 6), and the services within user interface system 310 (FIG. 3), network control system 315 (FIG. 3), and/or training system 320 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method implemented via execution of computing instructions at one or more processors, the method comprising:
    receiving a deployment model selection of a software-defined-network (SDN) control service, wherein the deployment model selection comprises one of a centralized model, a decentralized model, a distributed model, or a hybrid model; and
    deploying the SDN control service in the deployment model selection to control a physical computer network, wherein the SDN control service uses a routing agent model,
    wherein:
        the routing agent model is trained (i) using a meta-reinforcement-learning model with variants across training environments and at least one of training traffic, training scenarios, or training data deviation sets, and (ii) with automated degradations to the training environments that comprise synthetic replications of fingerprinted security attacks;
        the routing agent model is trained in portions using respective simulated subsets of the training environments at different times;
        the respective simulated subsets of the training environments are generated using hierarchical algorithmic clustering comprising first-order hierarchical clusters and second-order hierarchical clusters;
        the first-order hierarchical clusters are generated based on first relationship strength metrics between nodes of the training environments; and
        the second-order hierarchical clusters are generated based on second relationship strength metrics and dependencies among the first-order hierarchical clusters.

2. The method of claim 1, wherein the SDN control service in the centralized model comprises a central monitor service, a central SDN agent on a central SDN controller, and a respective management connection to each node of the physical computer network.

3. The method of claim 1, wherein the SDN control service in the decentralized model comprises a central monitor service, a central SDN agent on a central SDN controller, and a respective SDN child agent associated with each respective hierarchical domain of the physical computer network, wherein the respective SDN child agent comprises a respective management connection to each node in the respective hierarchical domain.

4. The method of claim 3 further comprising:
    training the respective SDN child agents of the SDN control service using a hierarchical reinforcement learning model.

5. The method of claim 1, wherein the SDN control service in the distributed model comprises a central monitor service and a respective local SDN agent associated with each node in the physical computer network.

6. The method of claim 5 further comprising:
    training each of the respective local SDN agents of the SDN control service locally using the meta-reinforcement-learning model.

7. The method of claim 1, wherein the SDN control service in the hybrid model comprises elements of two or more of the centralized model, the decentralized model, or the distributed model.

8. The method of claim 1, wherein routing within the SDN control service is performed based on flows defined by a source address, a destination address, and a datagram classification tuple.

9. The method of claim 1, wherein the routing agent model is trained using the meta-reinforcement-learning model with one or more traffic profiles or one or more application profiles to segment traffic in the physical computer network using a policy of the meta-reinforcement-learning model having a negative reward above a predetermined threshold upon at least one of: communication between predetermined endpoints or communication through a predetermined path.

10. The method of claim 1 further comprising:
    aggregating traffic profile data from customer profiles of customers using the SDN control service; and
    generating template profiles using the traffic profile data from the customer profiles.

11. The method of claim 1 further comprising:
    generating, in the SDN control service, lookup data for nodes of the physical computer network indexed by destination addresses of flows through the nodes, based on routing decisions provided by the routing agent model;
    using a predictive model to select predictive entries for the nodes from the lookup data based at least in part on frequencies of the flows; and
    sending the predictive entries to the nodes for local lookups in the nodes.

12. The method of claim 11 further comprising:
    receiving, at the SDN control service, an initial lookup request from a node of the physical computer network for a flow;
    determining an entire path of nodes of the physical computer network for the flow; and
    sending flow entries for the entire path of nodes to the node.

13. The method of claim 1, wherein:
    the physical computer network is connected, at a border node of the physical computer network, to an external network that is not controlled by the SDN control service; and
    the SDN control service is configured to exchange routing information with the external network via the border node.

14. A system comprising:
    one or more processors; and
    one or more non-transitory computer-readable media storing computing instructions that, when executed on the one or more processors, perform:
        receiving a deployment model selection of a software-defined-network (SDN) control service, wherein the deployment model selection comprises one of a centralized model, a decentralized model, a distributed model, or a hybrid model; and
        deploying the SDN control service in the deployment model selection to control a physical computer network, wherein the SDN control service uses a routing agent model, wherein:

the routing agent model is trained (i) using a meta-reinforcement-learning model with variants across training environments and at least one of training traffic, training scenarios, or training data deviation sets, and (ii) with automated degradations to the training environments that comprise synthetic replications of fingerprinted security attacks;

the routing agent model is trained in portions using respective simulated subsets of the training environments at different times;

the respective simulated subsets of the training environments are generated using hierarchical algorithmic clustering comprising first-order hierarchical clusters and second-order hierarchical clusters;

the first-order hierarchical clusters are generated based on first relationship strength metrics between nodes of the training environments; and the second-order hierarchical clusters are generated based on second relationship strength metrics and dependencies among the first-order hierarchical clusters.

15. The system of claim 14, wherein the SDN control service in the centralized model comprises a central monitor service, a central SDN agent on a central SDN controller, and a respective management connection to each node of the physical computer network.

16. The system of claim 14, wherein the SDN control service in the decentralized model comprises a central monitor service, a central SDN agent on a central SDN controller, and a respective SDN child agent associated with each respective hierarchical domain of the physical computer network, wherein the respective SDN child agent comprises a respective management connection to each node in the respective hierarchical domain.

17. The system of claim 16, wherein the computing instructions, when executed on the one or more processors, further perform:

training the respective SDN child agents of the SDN control service using a hierarchical reinforcement learning model.

18. The system of claim 14, wherein the SDN control service in the distributed model comprises a central monitor service and a respective local SDN agent associated with each node in the physical computer network.

19. The system of claim 18, wherein the computing instructions, when executed on the one or more processors, further perform:

training each of the respective local SDN agents of the SDN control service locally using the meta-reinforcement-learning model.

20. The system of claim 14, wherein the SDN control service in the hybrid model comprises elements of two or more of the centralized model, the decentralized model, or the distributed model.

21. The system of claim 14, wherein routing within the SDN control service is performed based on flows defined by a source address, a destination address, and a datagram classification tuple.

22. The system of claim 14, wherein the routing agent model is trained using the meta-reinforcement-learning model with one or more traffic profiles or one or more application profiles to segment traffic in the physical computer network using a policy of the meta-reinforcement-learning model having a negative reward above a predetermined threshold upon at least one of: communication between predetermined endpoints or communication through a predetermined path.

23. The system of claim 14, wherein the computing instructions, when executed on the one or more processors, further perform:

aggregating traffic profile data from customer profiles of customers using the SDN control service; and generating template profiles using the traffic profile data from the customer profiles.

24. The system of claim 14, wherein the computing instructions, when executed on the one or more processors, further perform:

generating, in the SDN control service, lookup data for nodes of the physical computer network indexed by destination addresses of flows through the nodes, based on routing decisions provided by the routing agent model;

using a predictive model to select predictive entries for the nodes from the lookup data based at least in part on frequencies of the flows; and sending the predictive entries to the nodes for local lookups in the nodes.

25. The system of claim 24, wherein the computing instructions, when executed on the one or more processors, further perform:

receiving, at the SDN control service, an initial lookup request from a node of the physical computer network for a flow;

determining an entire path of nodes of the physical computer network for the flow; and sending flow entries for the entire path of nodes to the node.

26. The system of claim 14, wherein:

the physical computer network is connected, at a border node of the physical computer network, to an external network that is not controlled by the SDN control service; and the SDN control service is configured to exchange routing information with the external network via the border node.

* * * * *